US012606583B2

(12) United States Patent
Wang et al.

(10) Patent No.: US 12,606,583 B2
(45) Date of Patent: Apr. 21, 2026

(54) IRON BIPYRIDINE COMPLEX, PREPARATION METHOD OF THE SAME, AND USE OF THE SAME IN POLYMERIZATION OF CONJUGATED DIENES

(71) Applicant: QINGDAO INSTITUTE OF BIOENERGY AND BIOPROCESS TECHNOLOGY, CHINESE ACADEMY OF SCIENCES, Shandong (CN)

(72) Inventors: Qinggang Wang, Shandong (CN); Liang Wang, Shandong (CN); Guangqian Zhu, Shandong (CN); Xianhui Zhang, Shandong (CN); Chuyang Jing, Shandong (CN)

(73) Assignee: QINGDAO INSTITUTE OF BIOENERGY AND BIOPROCESS TECHNOLOGY, CHINESE ACADEMY OF SCIENCES, Shandong (CN)

( * ) Notice: Subject to any disclaimer, the term of this patent is extended or adjusted under 35 U.S.C. 154(b) by 1085 days.

(21) Appl. No.: 17/049,899

(22) PCT Filed: Sep. 3, 2019

(86) PCT No.: PCT/CN2019/104144
§ 371 (c)(1),
(2) Date: Aug. 29, 2022

(87) PCT Pub. No.: WO2021/042258
PCT Pub. Date: Mar. 11, 2021

(65) Prior Publication Data
US 2023/0028849 A1 Jan. 26, 2023

(51) Int. Cl.

| | |
|---|---|
| ***C07F 15/02*** | (2006.01) |
| ***C08F 2/38*** | (2006.01) |
| ***C08F 4/70*** | (2006.01) |
| ***C08F 36/06*** | (2006.01) |
| ***C08F 36/08*** | (2006.01) |
| *B60C 1/00* | (2006.01) |

(52) U.S. Cl.
CPC .............. *C07F 15/025* (2013.01); *C08F 2/38* (2013.01); *C08F 4/7006* (2013.01); *C08F 36/06* (2013.01); *C08F 36/08* (2013.01); *B60C 1/00* (2013.01)

(58) Field of Classification Search
None
See application file for complete search history.

(56) References Cited

U.S. PATENT DOCUMENTS

| | | | | |
|---|---|---|---|---|
| 6,252,021 B1 * | 6/2001 | Lee | C08F 10/00 526/143 |
| 6,479,601 B1 * | 11/2002 | Kerns | C08F 36/04 526/348 |
| 2018/0051118 A1 * | 2/2018 | Castellani | C08L 9/06 |
| 2020/0347169 A1 * | 11/2020 | Takano | B60C 1/0025 |

FOREIGN PATENT DOCUMENTS

| | | | | |
|---|---|---|---|---|
| CN | 109790260 A | | 5/2019 | |
| CN | 109912732 A | | 6/2019 | |
| CN | 110283264 A | | 9/2019 | |
| CN | 110305168 A | | 10/2019 | |
| CN | 110305169 A | | 10/2019 | |
| CN | 110396150 A | | 11/2019 | |
| CN | 110452272 A | | 11/2019 | |
| WO | 0018776 A1 | | 4/2000 | |
| WO | WO-2019044855 A1 | * | 3/2019 | C08F 210/02 |
| WO | WO-2019205309 A1 | * | 10/2019 | C08F 136/08 |

OTHER PUBLICATIONS

G. Lefevre et al., European Journal of Organic Chemistry, 3768-3780 (2011) (Year: 2011).*
S. Öncel et al., 51 Journal of Elastomers & Plastics, 440-456 (2019) (Year: 2019).*
International Search Report of PCT/CN2019/104144 mailed Sep. 3, 2019.
English Abstract of CN109790260 retrieved from www.espacenet.com.
English Abstract of CN109912732 retrieved from www.espacenet.com.
English Abstract of CN110283264 retrieved from www.espacenet.com.
English Abstract of CN110305168 retrieved from www.espacenet.com.
English Abstract of CN110305169 retrieved from www.espacenet.com.
English Abstract of CN110396150 retrieved from www.espacenet.com.
English Abstract of CN110452272 retrieved from www.espacenet.com.

* cited by examiner

*Primary Examiner* — Alexander R Pagano
(74) *Attorney, Agent, or Firm* — Tutunjian & Bitetto, P.C.

(57) ABSTRACT

The invention discloses an iron bipyridine complex, a preparation method of the same, and use of the same in polymerization of conjugated dienes the invention provides an iron bipyridine complex, which is used as a primary catalyst showing high activity in the polymerization of polyprene to obtain a polymer with a high branched-chain degree. The polymer has the characteristics of a high molecular weight and narrow molecular weight distribution, and the molecular weight of the polymer can be adjusted by a chain transfer reagent. The obtained poly(conjugated diene) rubber has high branched-chain content and an ultrahigh molecular weight. Because there are a large number of side groups on the molecular chains of the rubber, the rubber is mainly used for preparing high-performance tires and other related rubber products with good wet traction and low friction-induced heat generation.

15 Claims, 7 Drawing Sheets

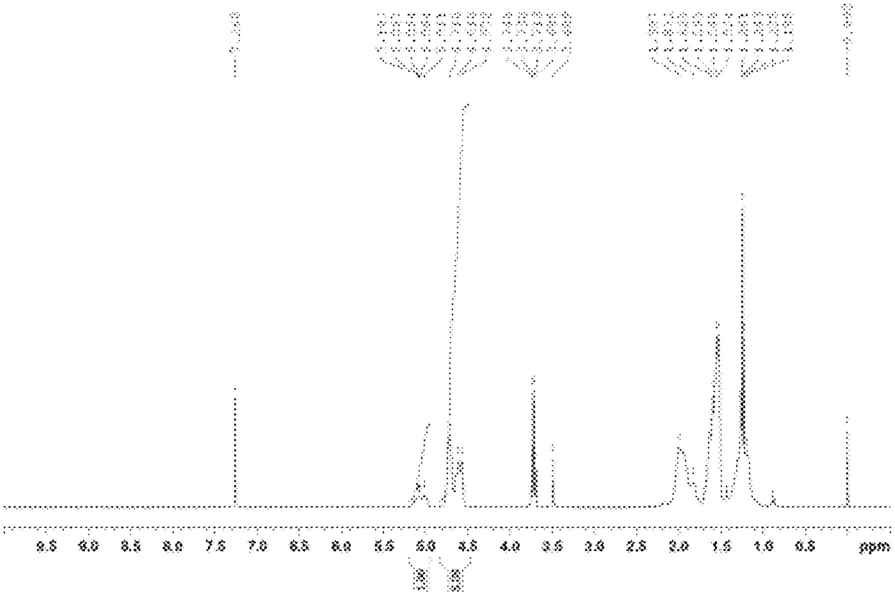
FIG. 2
FIG. 3
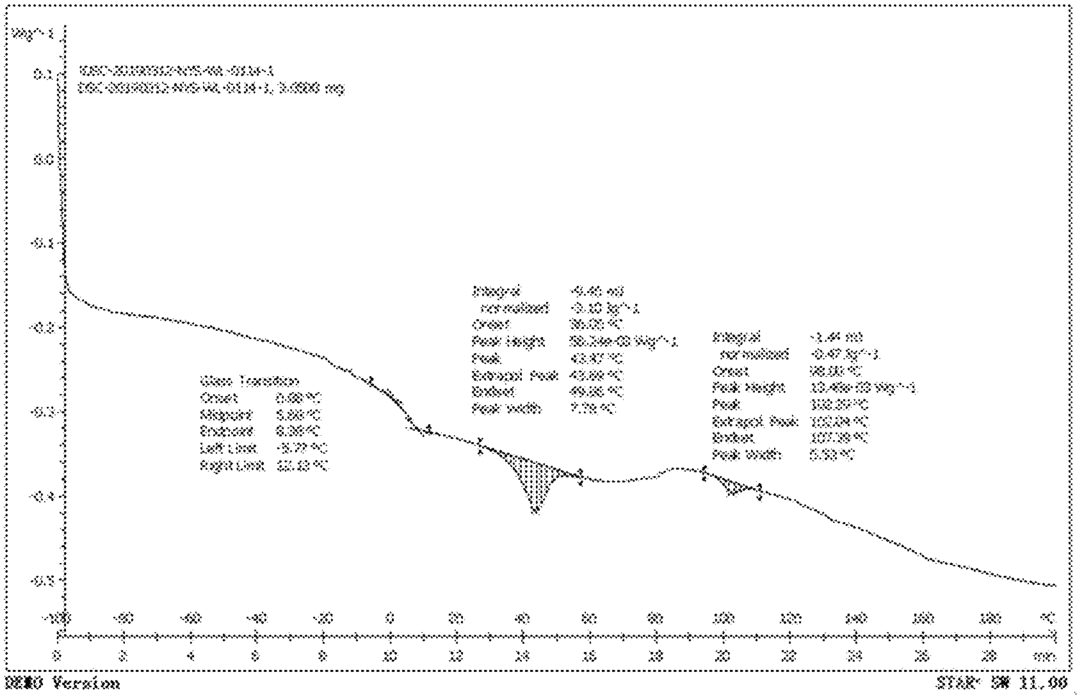

GPC/SEC Software Sample GPC Analysis Report

Agilent Technologies

Generated by lenovo at 16:43 on 2019年1月11日

Generated by Lenovo at 16:43 on January 11,

Results

Analysed by lenovo at 16:43:20 on 2019年1月11日

Comments

Lenovo at 16:43:20 on January 11, 2019

Molecular Weight Averages

| Peak | Mp | Mn | Mw | Mz | Mz+1 | Mv | PD |
|---|---|---|---|---|---|---|---|
| Peak 1 | 1577148 | 1192738 | 2251893 | 2908184 | 3859185 | 2863549 | 1.71 |

Peak Information

| | Start (mins) | End (mins) |
|---|---|---|
| Baseline region 1 | 4.17 | 4.33 |
| Baseline region 2 | 8.57 | 8.90 |
| | | |
| Peak 1 | 4.37 | 6.63 |

| Peak | Trace | Peak Max RT (mins) | Peak Area (mV.s) | Peak Height (mV) |
|---|---|---|---|---|
| Peak 1 | RI | 5.18 | 402884.636 | 8127.398 |

Chromatogram

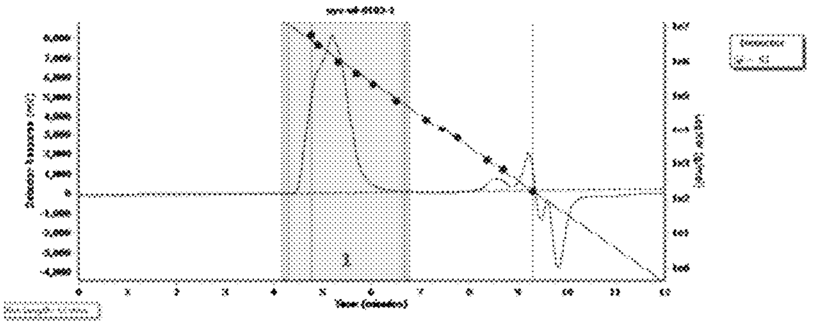

FIG. 4

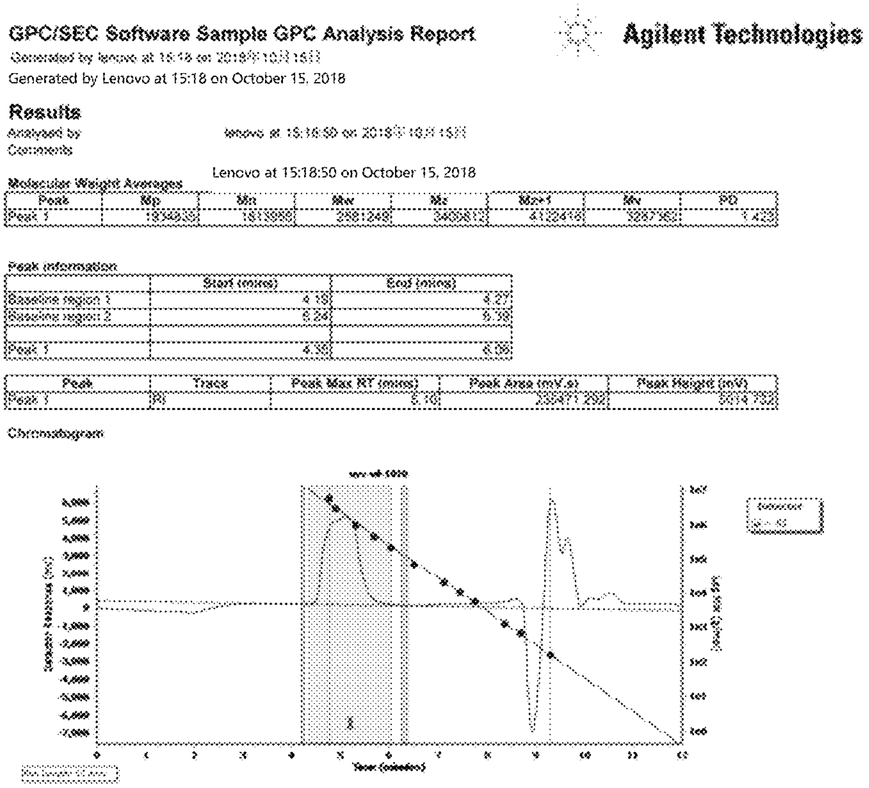

GPC/SEC Software Sample GPC Analysis Report

Agilent Technologies

Generated by Lenovo at 15:18 on October 15, 2018

Results

Analysed by

Comments

Lenovo at 15:18:50 on October 15, 2018

Molecular Weight Averages

| Peak | Mp | Mn | Mw | Mz | Mz+1 | Mv | PD |
|---|---|---|---|---|---|---|---|
| Peak 1 | [illegible] | [illegible] | 2581248 | 3405812 | 4122416 | 3287362 | 1.423 |

Peak information

| | Start (mins) | End (mins) |
|---|---|---|
| Baseline region 1 | 4.19 | 4.27 |
| Baseline region 2 | 6.24 | 6.38 |
| | | |
| Peak 1 | 4.39 | 6.06 |

| Peak | Trace | Peak Max RT (mins) | Peak Area (mV.s) | Peak Height (mV) |
|---|---|---|---|---|
| Peak 1 | RI | 5.10 | 235471.292 | 5014.752 |

Chromatogram

FIG. 7

IRON BIPYRIDINE COMPLEX, PREPARATION METHOD OF THE SAME, AND USE OF THE SAME IN POLYMERIZATION OF CONJUGATED DIENES

TECHNICAL FIELD

The invention relates to the field of polymer synthesis, and in particular relates to an iron bipyridine complex, a preparation method of the same, and use of the same in polymerization of conjugated dienes.

BACKGROUND

For a long time, the contradiction between rolling resistance and wet traction of a tire rubber material has always hindered the development and popularization of "green tires". The emergence of new materials such as trans-1,4-polyisoprene rubber (TPI), high vinyl polybutadiene rubber (HVBR) and 3,4-polyisoprene rubber (3,4-PIP) has opened up new approaches for the research and application of "green tires". The high vinyl polybutadiene rubber (HVBR) and 3,4-polyisoprene (3,4-PIP) have high wet traction, low rolling resistance and good shock absorption performances, and thus can be used for manufacturing high-performance tires. The moisture resistance and air tightness of such a rubber are close to those of butyl rubber. It can also be used in combination with ethylene propylene rubber for preparing vulcanized rubber with a high service performance, which meets the process requirements for manufacturing automobile profiles. At present, the general molecular weight of this kind of polyconjugated alkenes is between 200,000 g/mol-500,000 g/mol, and increasing the molecular weight of polymerization can significantly improve the physical and mechanical properties of a polymer, and can significantly enhance the impact resistance, low-temperature resistance, wear resistance and corrosion resistance of the polymer. Therefore, the polymer is an ideal polymer that can be applied in various fields instead of some steels. At the same time, it can also be blended with other polymers to prepare a novel multi-component composite material.

SUMMARY

Aiming at the problem of lack of a method for efficiently preparing poly(conjugated diene) with a high branched-chain degree and an ultrahigh molecular weight at present, the invention provides an iron bipyridine complex, a preparation method of the same, and use of the same in preparing iron-based poly(conjugated diene) with a high branched-chain degree and an ultrahigh molecular weight.

Firstly, the invention provides an iron bipyridine complex having a structural formula as any one of the following formulas:

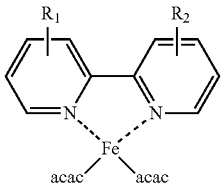

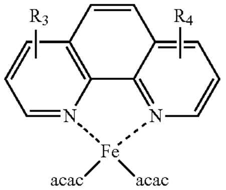

-continued

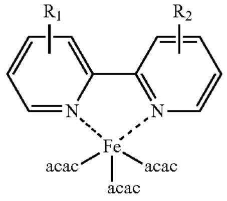

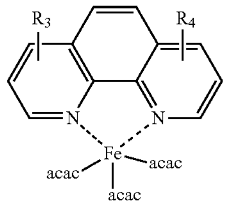

wherein $R_1$, $R_2$, $R_3$ and $R_4$ are the same or different; $R_1$, $R_2$, $R_3$ and $R_4$ respectively represent any one of H, $CH_3$, phenyl, methoxy or nitro.

Further, the structural formula of the iron bipyridine complex is any one of the following formulas:

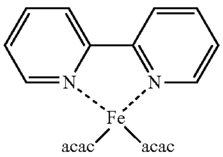

1

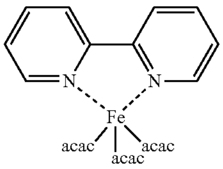

2

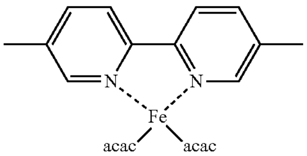

3

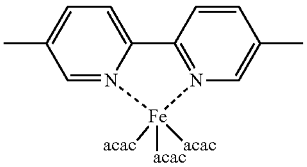

4

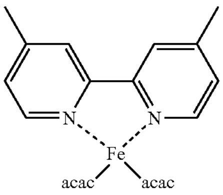

5

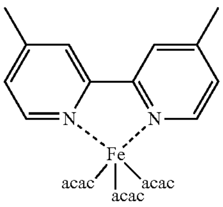

6

-continued

7

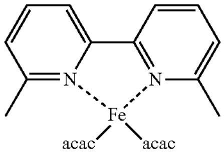

8

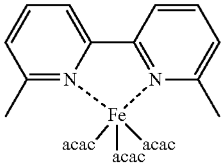

9

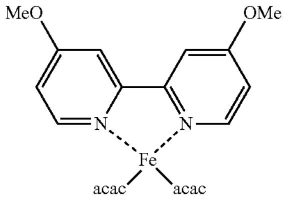

10

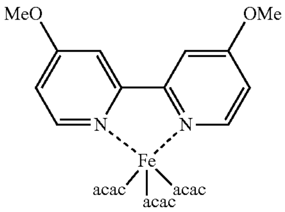

11

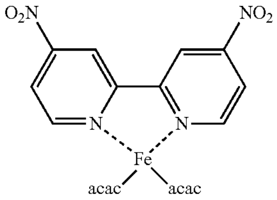

12

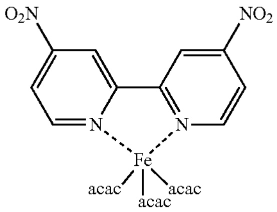

13

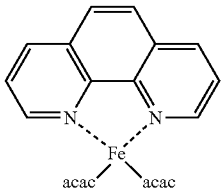

14

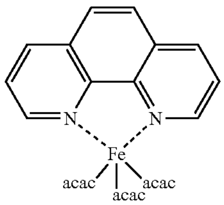

-continued

15

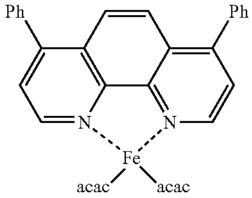

16

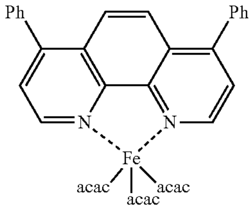

17

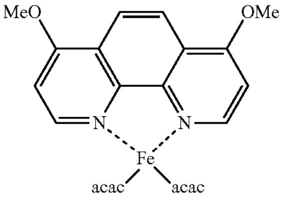

18

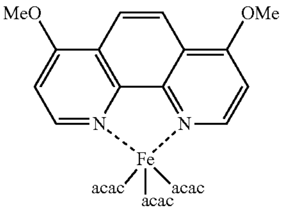

19

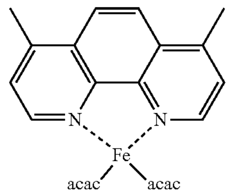

20

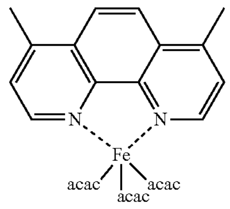

The invention also provides a method for preparing the aforementioned iron bipyridine complex: under an inert gas atmosphere, an ethanol solution of a bipyridine ligand is mixed with an ethanol solution of ferrous acetylacetonate or ferric acetylacetonate, reacted, and filtered, and the filtrate is concentrated and dried to obtain the iron bipyridine complex.

The molar ratio of the bipyridine ligand to the iron element is 1:1.

The invention also provides use of the aforementioned iron bipyridine complex in polymerization of conjugated dienes, wherein the method for polymerizing conjugated dienes includes the following three methods:

method 1: under an inert gas atmosphere a solvent and a conjugated diene monomer are sequentially added into a reactor and stirred, then added with a catalyst system premix, polymerized at a constant temperature of −40° C.-50° C. (preferably 25° C.) for 10 min-720 min (preferably 120 min), added with a quencher and an antiaging agent after the reaction is finished, washed with ethanol, and separated and purified to obtain a poly(conjugated diene) product; wherein the catalyst system premix is prepared from the iron bipyridine complex and a cocatalyst or prepared from the iron bipyridine complex, a cocatalyst and a dealkylation reagent;

method 2: under an inert gas atmosphere a solvent, a conjugated diene monomer and a catalyst are sequentially added into a reactor and stirred evenly, then added with a cocatalyst, and polymerized at a constant temperature of −40° C.-50° C. (preferably 25° C.) for 10 min-720 min (preferably 120 min), added with a quencher and an antiaging agent after the reaction is finished, washed twice with ethanol, and separated and purified to obtain poly(conjugated diene); and method 3: under an inert gas atmosphere a solvent, a conjugated diene monomer and a cocatalyst are sequentially added into a reactor and stirred evenly, then added with a catalyst, polymerized at a constant temperature of −40° C.-50° C. (preferably 25° C.) for 10 min-720 min (preferably 120 min), added with a quencher and an antiaging agent after the reaction is finished, washed twice with ethanol, and separated and purified to obtain poly(conjugated diene).

The conjugated diene monomer is one or a mixture of two of isoprene and butadiene, and preferably isoprene; the solvent is one or a mixture of more than two of toluene, n-hexane, cyclohexane, pentane, petroleum ether and hydrogenated gasoline; and the solvent is preferably n-hexane.

The cocatalyst is one or a mixture of more than two of methylaluminoxane (MAO), modified methylaluminoxane (MMAO), aluminium diethyl monochloride ($ClAlEt_2$), sesquiethyl aluminum chloride (SEAC), trimethyl aluminum ($AlMe_3$), triethylaluminum ($AlEt_3$), triisobutyl aluminum ($AliBu_3$), and preferably MAO; the general molecular formula of MAO is

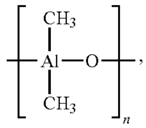, wherein n is a natural number of 4-40; and the dealkylation reagent is one of borates $[CPh_3]^+[B(C_6F_5)_4]^-$, $[NH_2Ph_2]^+[B(C_6F_5)_4]^-$ or $[NH_2Me_2]^+[B(C_6F_5)_4]^-$, and preferably $[CPh_3]^+[B(C_6F_5)_4]^-$.

When the catalyst system premix is prepared from the iron bipyridine complex and the cocatalyst, the molar ratio of the cocatalyst to the iron bipyridine complex is (5-1000):1, and preferably 200:1; the molar ratio of the conjugated diene monomer to the iron bipyridine complex is (1250-25000):1, and preferably 10000:1; and the volume ratio of the conjugated diene monomer to the solvent is 1:(2-50), and preferably 1:10.

When the catalyst system premix is prepared from the iron bipyridine complex, the cocatalyst and the dealkylation reagent, the molar ratio of the cocatalyst to the iron bipyridine complex is (5-200):1, and preferably 50:1; the molar ratio of the conjugated diene monomer to the iron bipyridine complex is (1250-10000):1, and preferably 5000:1; the volume ratio of the conjugated diene monomer to the solvent is 1:(2-50), and preferably 1:10; and the molar ratio of the dealkylation reagent to the iron bipyridine complex is (1-10):1, and preferably 1:1.

When the solvent and the conjugated diene monomer are added into the reactor, a chain transfer reagent can also be added to adjust the molecular weight, wherein the chain transfer reagent is one of allyl chloride, allyl bromide, diethylsilane, triphenylsilane, trimethylsilane, triethylaluminum and triisobutylaluminum, and preferably allyl chloride, and the molar ratio of the chain transfer reagent to the iron bipyridine complex is (1-50):1, and preferably 15:1.

The quencher is a solution of methanol in hydrochloric acid, and the volume ratio of MeOH/HCl is 50/1.

The antiaging agent is a solution of 1% 2,6-di-tert-butyl-4-methylphenol in ethanol.

The poly(conjugated diene) prepared by the aforementioned method has a molecular weight of 500,000-2,000,000, a molecular weight distribution of 1.5-8.0; a proportion of cis-1,4 structure of 20%-40%, a proportion of trans-1,4 structure of 0%-20%, and a proportion of 3,4-(1,2-) structure of 60%-80%.

Beneficial Effects

The invention provides a novel high-efficiency iron catalyst system by using the cheap iron as the metal center and using the bipyridine ligand as the main backbone. The metal complex iron bipyridine is used as a primary catalyst and methylaluminoxane (MAO) is used as a cocatalyst to catalyze the polymerization of conjugated dienes. The polymer provided by the invention has controllable molecular mass (the number average molecular weight is 500,000-2,000,000 g/mol), a high branched-chain degree (with the content of the 3,4-(1,2-) structure of 60-80%), and narrow molecular weight distribution (PDI=1.5-8.0). The resultant technical effects are summarized as follows.

1. The polyconjugate alkenes of the invention has the number average molecular weight of 500,000-2,000,000, the molecular weight distribution of 1.5-8.0; the proportion of the side chain structure 3,4-(1,2-) in the range of 60%-80%, the proportion of the trans-1,4 structure of 0%-20%, and the proportion of the cis-1,4 structure in the range of 20%-40%.
2. The iron catalytic system of the invention is an iron bipyridine complex with a definite molecular structure, which has the advantages of simple and easily-available preparation, high activity, low cost and good catalyst solubility in alkanes; the microstructure of the polymer can be regulated by adjusting the structure of the primary catalyst, and the molecular weight of the polymer can be regulated by the chain transfer reagent.
3. The polymerization reaction of the invention can be carried out in either the two components consisting of methylaluminoxane and the iron bipyridine complex or the three components consisting of alkyl aluminum, the dealkylation reagent, and the iron bipyridine complex. The cost of polymerization is low, and thus the invention has the prospect of industrial application.

BRIEF DESCRIPTION OF THE DRAWINGS

FIG. 2 is an $^1$HNMR diagram of ultrahigh molecular weight polyisoprene prepared in Example 21;

FIG. 3 is a DSC chart of ultrahigh molecular weight polyisoprene prepared in Example 21;

FIG. 4 is a GPC chart of ultrahigh molecular weight polybutadiene prepared in Example 58;

FIG. 7 is a GPC chart of ultrahigh molecular weight polyisoprene-butadiene prepared in Example 59;

DESCRIPTION OF THE EMBODIMENTS

Figure 1:
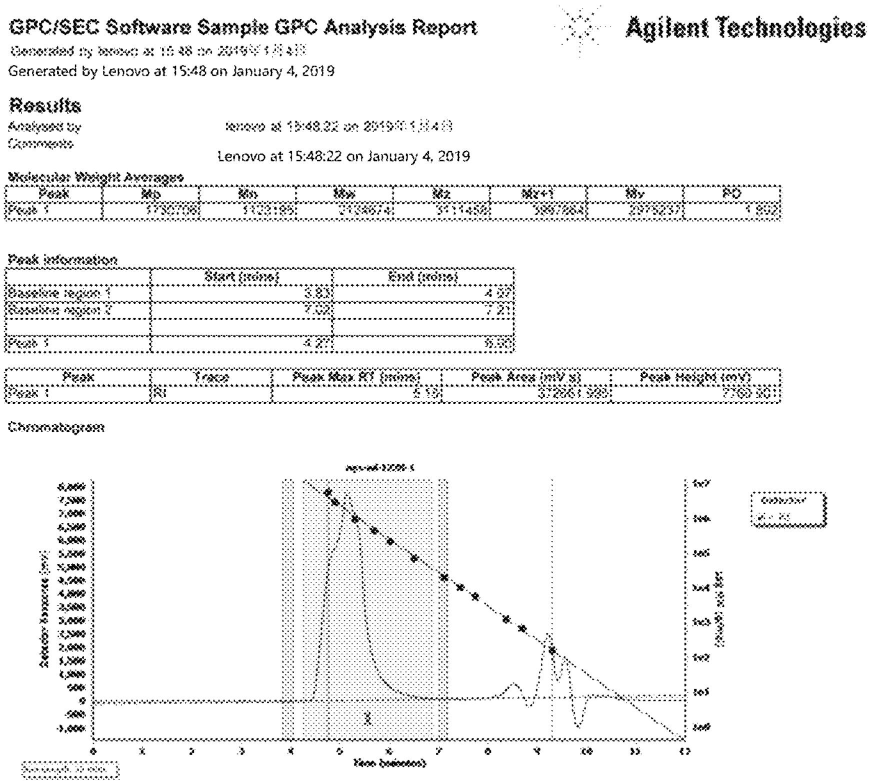
FIG. 1 is a GPC chart of ultrahigh molecular weight polyisoprene prepared in Example 21.
Figure 5:
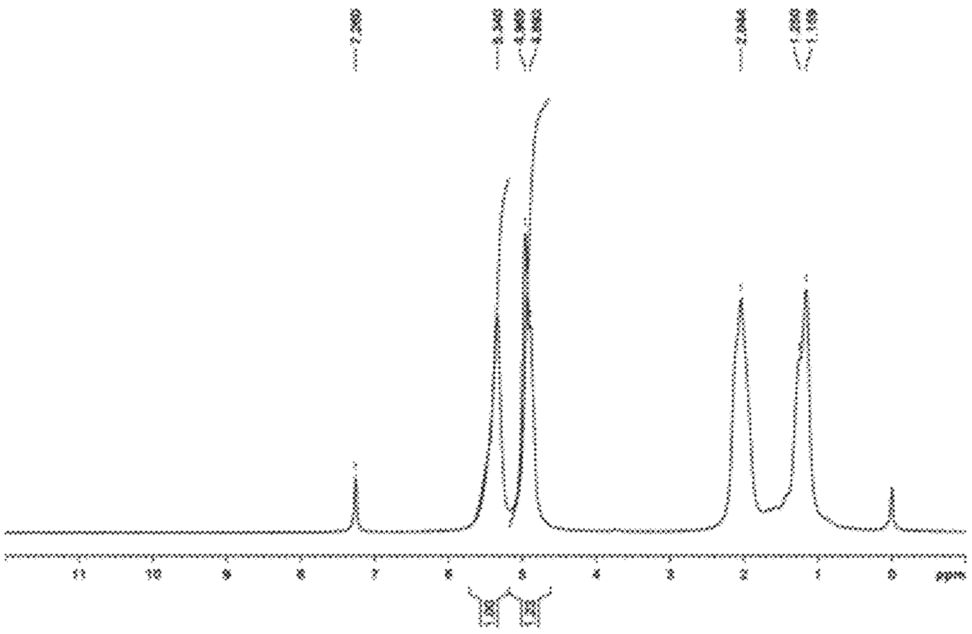
FIG. 5 is an $^1$HNMR diagram of ultrahigh molecular weight polybutadiene prepared in Example 58.
Figure 6:
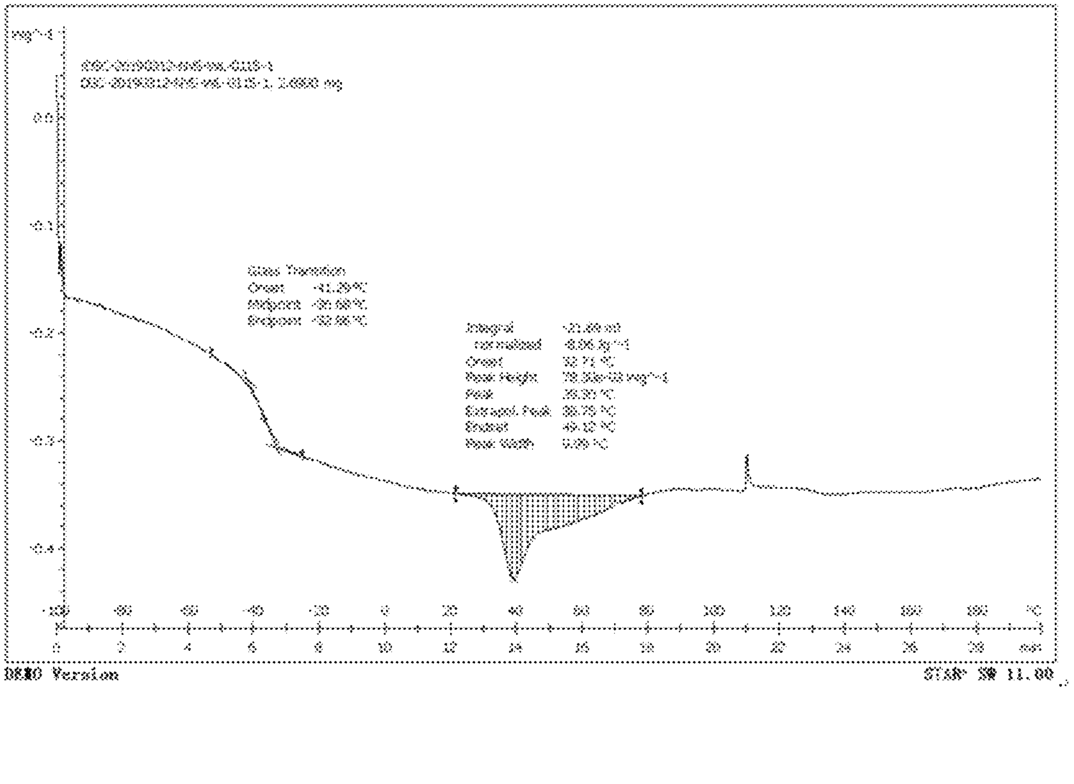
FIG. 6 is a DSC chart of ultrahigh molecular weight polybutadiene prepared in Example 58.
Figure 8:
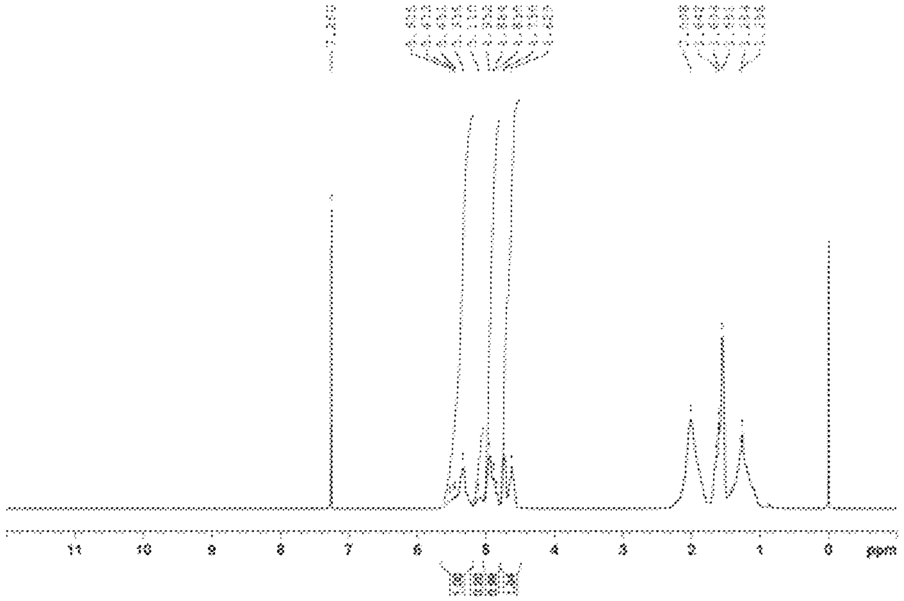
FIG. 8 is an $^1$HNMR diagram of ultrahigh molecular weight polyisoprene-butadiene prepared in Example 59.
Figure 9:
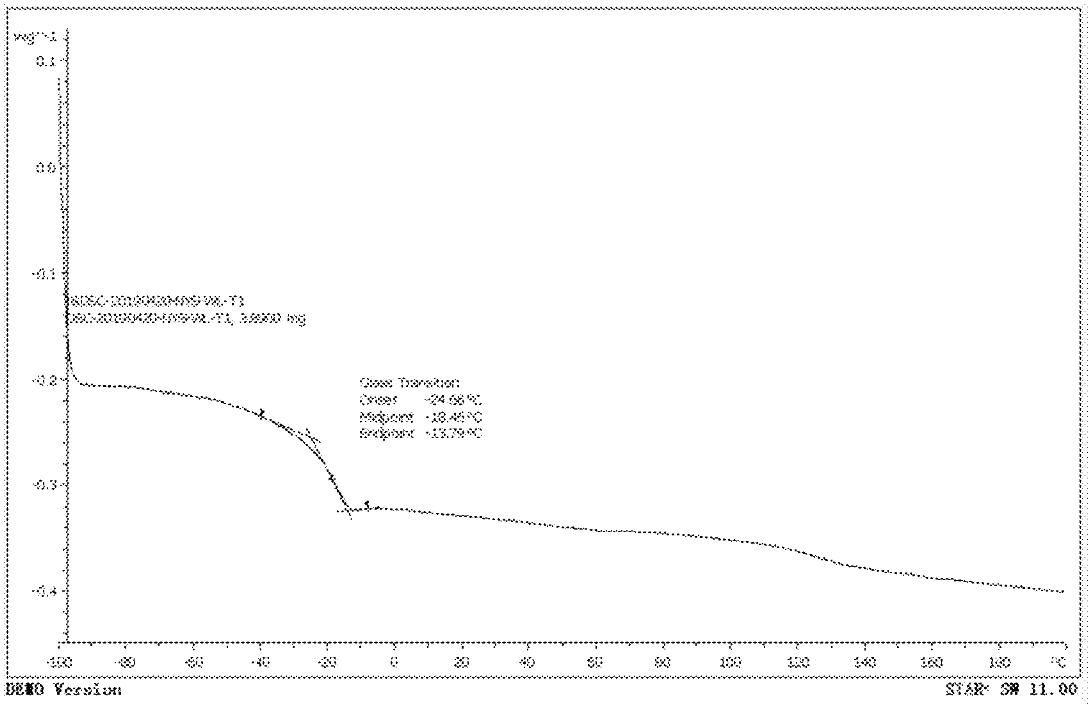
FIG. 9 is a DSC chart of ultrahigh molecular weight polyisoprene-butadiene prepared in Example 59.
Figure 10:
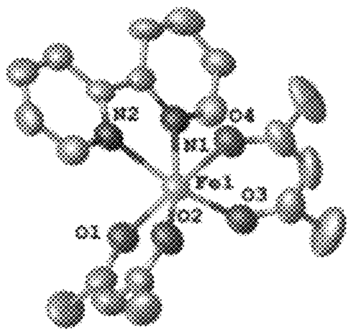
FIG. 10 shows the single-crystal structure of a catalyst 1 prepared in Example 1.
Figure 11:
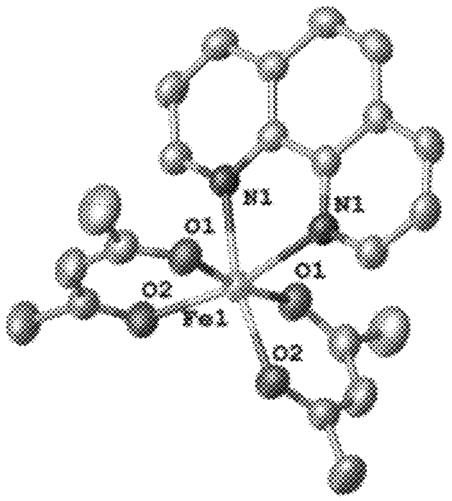
FIG. 11 shows the single-crystal structure of a catalyst 13 prepared in Example 13.

Unless otherwise stated, all reactions and operations of air-sensitive compounds are carried out under a standard inert gas atmosphere (Ar). A metal complex is prepared in a glove box, and polymerized by using a Schlenk technology. A glassware is used after flame drying and introduction of argon atmosphere. Toluene, DCM, THF and hexane are purchased from Sinopharm Chemical Reagent Co., Ltd. (Shanghai, China). All solvents used in the reaction are distilled by sodium/benzophenone (toluene) or calcium hydride (dichloromethane, hexane). Organic reactions are monitored by thin layer chromatography (TLC) using a 0.2 mm Macherey-Nagel silica gel-precoated plate (POLYGRAM SILG/UV254). $^1$H and $^{13}$C NMR spectra are recorded on a Bruker Avance III 400 MHz spectrometer by using $CDCl_3$ as a solvent and TMS as an internal reference. The following abbreviations are used to express the multiplicity of chemical shift: s=single peak, d=double peak, t=triple peak, q=quartet peak, p=pentet, m=multiple peak, and b=broad peak. The molecular weight and molecular weight distribution are determined through high-temperature gel permeation chromatography (HGPC, PL-GPC 220, Agilent Technologies, USA) by using THF as an eluent, or through gel permeation chromatography (GPC) by using trichlorobenzene as an eluent and polystyrene as a standard. Before polymerization, isoprene (Aladdin Industrial Corporation, Shanghai, China) is dried over $CaH_2$. Ligands are prepared according to the reported procedure. Complexes are synthesized according to the reported methods. The synthesized products are characterized by X-ray diffraction analysis.

The antiaging agent used in the implementation examples of polymerization of conjugated dienes is a solution of 1% 2,6-di-tert-butyl-4-methylphenolin ethanol.

All bipyridine ligands, iron salts and other reagents are purchased from commercial sources, and can be used without further purification.

I. Preparation of Iron Bipyridine Complex

Example 1. Preparation of Iron Bipyridine Complex Catalyst 1 (with the Structure Formula Below)

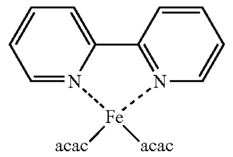

1

Under argon atmosphere, into a 50 mL Schlenk flask added was anhydrous $Fe(acac)_2$ (127.0 mg, 0.5 mmol), which was dissolved with 6 mL anhydrous ethanol at 60° C. Then a solution of 2,2'-bipyridine (78.0 mg, 0.5 mmol) in ethanol (4 mL) was added dropwise into the system. The system was reacted at 60° C. for half an hour, and then returned to room temperature and stirred overnight. Filtration was conducted, and the filtrate was collected, concentrated, washed twice with cold ethanol, and dried in vacuum for 12 h to obtain a pale brown solid product 1 with a yield of 68%.

Mass spectrometry: $C_{20}H_{22}FeN_2O_4$: [M+H]+: theoretical value: 411.1002; and measured value: 410.0998.

Elemental analysis: $C_{20}H_{22}FeN_2O_4$: theoretical values: 58.55% of C, 5.41% of H, and 6.83% of N; and measured values: 58.34% of C, 5.53% of H, and 7.09% of N.

Example 2. Preparation of Iron Pyridine Imine Complex Catalyst 2 (with the Structure Formula Below)

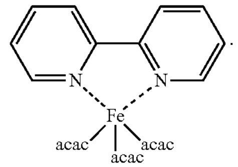

2

Under argon atmosphere, into a 50 mL Schlenk flask added was anhydrous $Fe(acac)_3$ (211.8 mg, 0.6 mmol), which was dissolved with 6 mL anhydrous ethanol at 60° C. Then a solution of 2,2'-bipyridine (93.6 mg, 0.6 mmol) in ethanol (4 mL) was added dropwise into the system. The system was reacted at 60° C. for half an hour, and then returned to room temperature and stirred overnight. Filtration was conducted, and the filtrate was collected, concentrated, washed twice with cold ethanol, and dried in vacuum for 12 h to obtain a reddish orange solid product 2 with a yield of 78%.

Mass spectrometry: $C_{25}H_{29}FeN_2O_6$: $[M+H]^+$: theoretical value: 510.1448; and measured value: 510.1443.

Elemental analysis: $C_{25}H_{29}FeN_2O_6$: theoretical values: 58.95% of C, 5.74% of H, and 5.50% of N; and measured values: 58.54% of C, 5.61% of H, and 5.85% of N.

Example 3. Preparation of Iron Pyridine Imine Complex Catalyst 3 (with the Structure Formula Below)

3

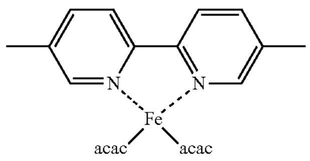

Under argon atmosphere, into a 50 mL Schlenk flask added was anhydrous $Fe(acac)_2$ (127 mg, 0.5 mmol), which was dissolved with 6 mL anhydrous ethanol at 60° C. Then a solution of 5,5'-dimethyl-2,2'-bipyridine (92.0 mg, 0.5 mmol) in ethanol (4 mL) was added dropwise into the system. The system was reacted at 60° C. for half an hour, and then returned to room temperature and stirred overnight. Filtration was conducted, and the filtrate was collected, concentrated, washed twice with cold ethanol, and dried in vacuum for 12 h to obtain a dark brown solid product 3 with a yield of 55%.

Mass spectrometry: $C_{22}H_{26}FeN_2O_4$: $[M+H]^+$: theoretical value: 439.1315; and measured value: 439.1319.

Elemental analysis: $C_{22}H_{26}FeN_2O_4$: theoretical values: 60.29% of C, 5.98% of H, and 6.39% of N; and measured values: 59.90% of C, 6.21% of H, and 6.65% of N.

Example 4. Preparation of Iron Pyridine Imine Complex Catalyst 4 (with the Structure Formula Below)

4

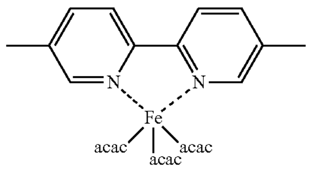

Under argon atmosphere, into a 50 mL Schlenk flask added was anhydrous $Fe(acac)_3$ (211.8 mg, 0.6 mmol), which was dissolved with 6 mL anhydrous ethanol at 60° C. Then a solution of 5,5'-dimethyl-2,2'-bipyridine (110.4 mg, 0.6 mmol) in ethanol (4 mL) was added dropwise into the system. The system was reacted at 60° C. for half an hour, and then returned to room temperature and stirred overnight. Filtration was conducted, and the filtrate was collected, concentrated, washed twice with cold ethanol, and dried in vacuum for 12 h to obtain a reddish orange solid product 4 with a yield of 64%.

Mass spectrometry: $C_{27}H_{33}FeN_2O_6$: $[M+H]^+$: theoretical value: 538.1761; and measured value: 538.1758.

Elemental analysis: $C_{27}H_{33}FeN_2O_6$: theoretical values: 60.34% of C, 6.19% of H, and 5.21% of N; and measured values: 60.25% of C, 6.32% of H, and 5.15% of N.

Example 5. Preparation of Iron Pyridine Imine Complex Catalyst 5 (with the Structure Formula Below)

5

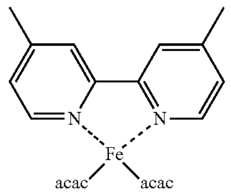

Under argon atmosphere, into a 50 mL Schlenk flask added was anhydrous $Fe(acac)_2$ (127.0 mg, 0.5 mmol), which was dissolved with 6 mL anhydrous ethanol at 60° C. Then a solution of 4,4'-dimethyl-2,2'-bipyridine (92.0 mg, 0.5 mmol) in ethanol (4 mL) was added dropwise into the system. The system was reacted at 60° C. for half an hour, and then returned to room temperature and stirred overnight. Filtration was conducted, and the filtrate was collected, concentrated, washed twice with cold ethanol, and dried in vacuum for 12 h to obtain a dark brown solid product 5 with a yield of 59%.

Mass spectrometry: $C_{22}H_{26}FeN_2O_4$: [M+H]+: theoretical value: 439.1315; and measured value: 439.1318.

Elemental analysis: $C_{22}H_{26}FeN_2O_4$: theoretical values: 60.29% of C, 5.98% of H, and 6.39% of N; and measured values: 60.18% of C, 6.11% of H, and 6.48% of N.

Example 6. Preparation of Iron Pyridine Imine Complex Catalyst 6 (with the Structure Formula Below)

6

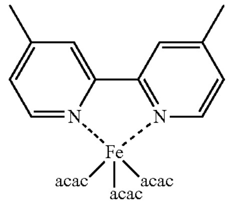

Under argon atmosphere, into a 50 mL Schlenk flask added was anhydrous $Fe(acac)_3$ (211.8 mg, 0.6 mmol), which was dissolved with 6 mL anhydrous ethanol at 60° C. Then a solution of 4,4'-dimethyl-2,2'-bipyridine (110.4 mg, 0.6 mmol) in ethanol (4 mL) was added dropwise into the system. The system was reacted at 60° C. for half an hour, and then returned to room temperature and stirred overnight. Filtration was conducted, and the filtrate was collected, concentrated, washed twice with cold ethanol, and dried in vacuum for 12 h to obtain a reddish orange solid product 6 with a yield of 60%.

Mass spectrometry: $C_{27}H_{33}FeN_2O_6$: [M+H]+: theoretical value: 538.1761; and measured value: 538.1760.

Elemental analysis: $C_{27}H_{33}FeN_2O_6$: theoretical values: 60.34% of C, 6.19% of H, and 5.21% of N; and measured values: 60.25% of C, 6.32% of H, and 5.15% of N.

Example 7. Preparation of Iron Pyridine Imine Complex Catalyst 7 (with the Structure Formula Below)

7

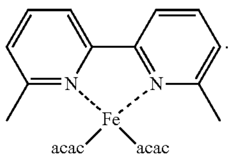

Under argon atmosphere, into a 50 mL Schlenk flask added was anhydrous $Fe(acac)_2$ (127 mg, 0.5 mmol), which was dissolved with 6 mL anhydrous ethanol at 60° C. Then a solution of 6,6'-dimethyl-2,2'-bipyridine (92.0 mg, 0.5 mmol) in ethanol (4 mL) was added dropwise into the system. The system was reacted at 60° C. for half an hour, and then returned to room temperature and stirred overnight. Filtration was conducted, and the filtrate was collected, concentrated, washed twice with cold ethanol, and dried in vacuum for 12 h to obtain a dark brown solid product 7 with a yield of 59%.

Mass spectrometry: $C_{22}H_{26}FeN_2O_4$: [M+H]+: theoretical value: 439.1315; and measured value: 439.1320.

Elemental analysis: $C_{22}H_{26}FeN_2O_4$: theoretical values: 60.29% of C, 5.98% of H, and 6.39% of N; and measured values: 60.35% of C, 6.02% of H, and 6.57% of N.

Example 8. Preparation of Iron Pyridine Imine Complex Catalyst 8 (with the Structure Formula Below)

8

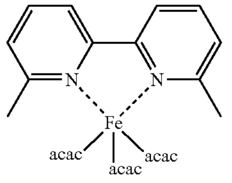

Under argon atmosphere, into a 50 mL Schlenk flask added was anhydrous $Fe(acac)_3$ (211.8 mg, 0.6 mmol), which was dissolved with 6 mL anhydrous ethanol at 60° C. Then a solution of 6,6'-dimethyl-2,2'-bipyridine (110.4 mg, 0.6 mmol) in ethanol (4 mL) was added dropwise into the system. The system was reacted at 60° C. for half an hour, and then returned to room temperature and stirred overnight. Filtration was conducted, and the filtrate was collected, concentrated, washed twice with cold ethanol, and dried in vacuum for 12 h to obtain a reddish orange solid product 8 with a yield of 80%.

Mass spectrometry: $C_{27}H_{33}FeN_2O_6$: [M+H]+: theoretical value: 538.1761; and measured value: 538.1763.

Elemental analysis: $C_{27}H_{33}FeN_2O_6$: theoretical values: 60.34% of C, 6.19% of H, and 5.21% of N; and measured values: 60.25% of C, 6.32% of H, and 5.15% of N.

Example 9. Preparation of Iron Pyridine Imine Complex Catalyst 9 (with the Structure Formula Below)

9

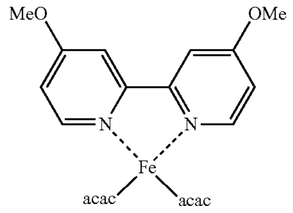

Under argon atmosphere, into a 50 mL Schlenk flask added was anhydrous $Fe(acac)_2$ (127.0 mg, 0.5 mmol), which was dissolved with 6 mL anhydrous ethanol at 60° C. Then a solution of 4,4'-dimethoxy-2,2'-bipyridine (108.0 mg, 0.5 mmol) in ethanol (4 mL) was added dropwise into the system. The system was reacted at 60° C. for half an hour, and then returned to room temperature and stirred overnight. Filtration was conducted, and the filtrate was collected, concentrated, washed twice with cold ethanol, and dried in vacuum for 12 h to obtain a black brown solid product 9 with a yield of 45%.

Mass spectrometry: $C_{22}H_{26}FeN_2O_6$: [M+H]+: theoretical value: 471.1213; and measured value: 471.1215.

Elemental analysis: $C_{22}H_{26}FeN_2O_6$: theoretical values: 56.19% of C, 5.57% of H, and 5.96% of N; and measured values: 56.63% of C, 5.12% of H, and 6.13% of N.

Example 10. Preparation of Iron Pyridine Imine Complex Catalyst 10 (with the Structure Formula Below)

10

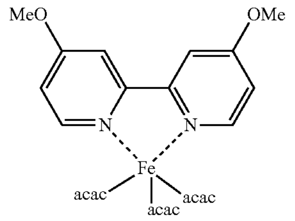

Under argon atmosphere, into a 50 mL Schlenk flask added was anhydrous $Fe(acac)_3$ (211.8 mg, 0.6 mmol), which was dissolved with 6 mL anhydrous ethanol at 60° C. Then a solution of 4,4'-dimethoxy-2,2'-bipyridine (129.6 mg, 0.6 mmol) in ethanol (4 mL) was added dropwise into the system. The system was reacted at 60° C. for half an hour, and then returned to room temperature and stirred overnight. Filtration was conducted, and the filtrate was collected, concentrated, washed twice with cold ethanol, and dried in vacuum for 12 h to obtain a black brown solid product 10 with a yield of 36%.

Mass spectrometry: $C_{27}H_{33}FeN_2O_8$: [M+H]+: theoretical value: 570.1659; and measured value: 570.1663.

Elemental analysis: $C_{27}H_{33}FeN_2O_8$: theoretical values: 56.95% of C, 5.84% of H, and 4.92% of N; and measured values: 56.48% of C, 5.99% of H, and 4.76% of N.

Example 11. Preparation of Iron Pyridine Imine Complex Catalyst 11 (with the Structure Formula Below)

11

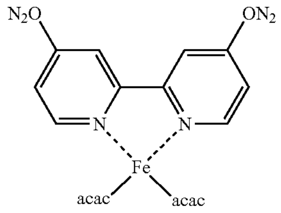

Under argon atmosphere, into a 50 mL Schlenk flask added was anhydrous $Fe(acac)_2$ (127.0 mg, 0.5 mmol), which was dissolved with 6 mL anhydrous ethanol at 60° C. Then a solution of 4,4'-dinitro-2,2'-bipyridine (123.0 mg, 0.5 mmol) in ethanol (4 mL) was added dropwise into the system. The system was reacted at 60° C. for half an hour, and then returned to room temperature and stirred overnight. Filtration was conducted, and the filtrate was collected, concentrated, washed twice with cold ethanol, and dried in vacuum for 12 h to obtain a black brown solid product 11 with a yield of 41%.

Mass spectrometry: $C_{20}H_{20}FeN_4O_8$: [M+H]+: theoretical value: 501.0703; and measured value: 501.0705.

Elemental analysis: $C_{20}H_{20}FeN_4O_8$: theoretical values: 48.02% of C, 4.03% of H, and 11.20% of N; and measured values: 48.45% of C, 4.56% of H, and 11.41% of N.

Example 12. Preparation of Iron Pyridine Imine Complex Catalyst 12 (with the Structure Formula Below)

12

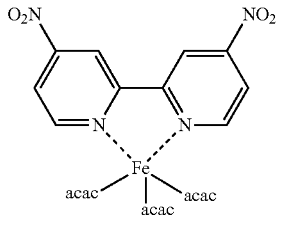

Under argon atmosphere, into a 50 mL Schlenk flask added was anhydrous $Fe(acac)_3$ (211.8 mg, 0.6 mmol), which was dissolved with 6 mL anhydrous ethanol at 60° C. Then a solution of 4,4'-dinitro-2,2'-bipyridine (147.6 mg, 0.6 mmol) in ethanol (4 mL) was added dropwise into the system. The system was reacted at 60° C. for half an hour, and then returned to room temperature and stirred overnight. Filtration was conducted, and the filtrate was collected, concentrated, washed twice with cold ethanol, and dried in vacuum for 12 h to obtain a black brown solid product 12 with a yield of 35%.

Mass spectrometry: $C_{25}H_{27}FeN_4O_{10}$: [M+H]+: theoretical value: 600.1150; and measured value: 600.1154.

Elemental analysis: $C_{25}H_{27}FeN_4O_{10}$: theoretical values: 50.10% of C, 4.54% of H, and 9.35% of N; and measured values: 50.56% of C, 4.98% of H, and 9.65% of N.

Example 13. Preparation of Iron Pyridine Imine Complex Catalyst 13 (with the Structure Formula Below)

13

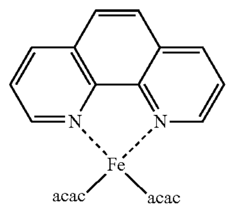

Under argon atmosphere, into a 50 mL Schlenk flask added was anhydrous $Fe(acac)_2$ (127.0 mg, 0.5 mmol), which was dissolved with 6 mL anhydrous ethanol at 60° C. Then a solution of 1,10-phenanthroline (90.5 mg, 0.5 mmol) in ethanol (4 mL) was added dropwise into the system. The system was reacted at 60° C. for half an hour, and then returned to room temperature and stirred overnight. Filtration was conducted, and the filtrate was collected, concentrated, washed twice with cold ethanol, and dried in vacuum for 12 h to obtain a black brown solid product 13 with a yield of 58%.

Mass spectrometry: $C_{22}H_{22}FeN_2O_4$: [M+H]+: theoretical value: 435.1002; and measured value: 435.1005.

Elemental analysis: $C_{22}H_{22}FeN_2O_4$: theoretical values: 60.85% of C, 5.11% of H, and 6.45% of N; and measured values: 61.02% of C, 5.25% of H, and 6.55% of N.

Example 14. Preparation of Iron Pyridine Imine Complex Catalyst 14 (with the Structure Formula Below)

14

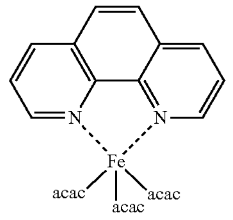

Under argon atmosphere, into a 50 mL Schlenk flask added was anhydrous $Fe(acac)_3$ (211.8 mg, 0.6 mmol), which was dissolved with 6 mL anhydrous ethanol at 60° C. Then a solution of 1,10-phenanthroline (108.0 mg, 0.6 mmol) in ethanol (4 mL) was added dropwise into the system. The system was reacted at 60° C. for half an hour, and then returned to room temperature and stirred overnight. Filtration was conducted, and the filtrate was collected, concentrated, washed twice with cold ethanol, and dried in vacuum for 12 h to obtain a reddish orange solid product 14 with a yield of 70%.

Mass spectrometry: $C_{27}H_{29}FeN_2O_6$: [M+H]+: theoretical value: 534.1452; and measured value: 534.11455.

Elemental analysis: $C_{27}H_{29}FeN_2O_6$: theoretical values: 60.80% of C, 5.48% of H, and 5.25% of N; and measured values: 60.52% of C, 5.32% of H, and 5.15% of N.

Example 15. Preparation of Iron Pyridine Imine Complex Catalyst 15 (with the Structure Formula Below)

15

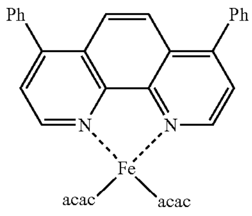

Under argon atmosphere, into a 50 mL Schlenk flask added was anhydrous $Fe(acac)_2$ (127.0 mg, 0.5 mmol), which was dissolved with 6 mL anhydrous ethanol at 60° C. Then a solution of 4,4'-diphenyl-1,10-phenanthroline (166.0 mg, 0.5 mmol) in ethanol (4 mL) was added dropwise into the system. The system was reacted at 60° C. for half an hour, and then returned to room temperature and stirred overnight. Filtration was conducted, and the filtrate was collected, concentrated, washed twice with cold ethanol, and dried in vacuum for 12 h to obtain a black brown solid product 15 with a yield of 55%.

Mass spectrometry: $C_{34}H_{30}FeN_2O_4$: [M+H]+: theoretical value: 587.1628; and measured value: 587.1631.

Elemental analysis: $C_{34}H_{30}FeN_2O_4$: theoretical values: 69.63% of C, 5.16% of H, and 4.78% of N; and measured values: 69.52% of C, 5.28% of H, and 5.05% of N.

Example 16. Preparation of Iron Pyridine Imine Complex Catalyst 16 (with the Structure Formula Below)

16

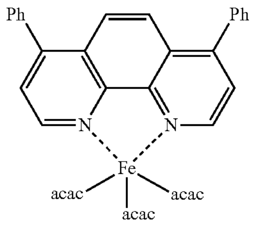

Under argon atmosphere, into a 50 mL Schlenk flask added was anhydrous $Fe(acac)_3$ (211.8 mg, 0.6 mmol), which was dissolved with 6 mL anhydrous ethanol at 60° C. Then a solution of 4,4'-diphenyl-1,10-phenanthroline (199.2 mg, 0.6 mmol) in ethanol (4 mL) was added dropwise into the system. The system was reacted at 60° C. for half an hour, and then returned to room temperature and stirred overnight. Filtration was conducted, and the filtrate was collected, concentrated, washed twice with cold ethanol, and dried in vacuum for 12 h to obtain a black brown solid product 16 with a yield of 55%.

Mass spectrometry: $C_{39}H_{37}FeN_2O_6$: [M+H]+: theoretical value: 686.2074; and measured value: 686.2070.

Elemental analysis: $C_{39}H_{37}FeN_2O_6$: theoretical values: 68.33% of C, 5.44% of H, and 4.09% of N; and measured values: 68.89% of C, 6.03% of H, and 3.85% of N.

Example 17. Preparation of Iron Pyridine Imine Complex Catalyst 17 (with the Structure Formula Below)

17

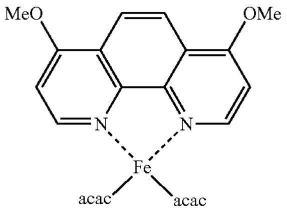

Under argon atmosphere, into a 50 mL Schlenk flask added was anhydrous $Fe(acac)_2$ (127.0 mg, 0.5 mmol), which was dissolved with 6 mL anhydrous ethanol at 60° C. Then a solution of 4,7-dimethoxy-1,10-phenanthroline (120 mg, 0.5 mmol) in ethanol (4 mL) was added dropwise into the system. The system was reacted at 60° C. for half an hour, and then returned to room temperature and stirred overnight. Filtration was conducted, and the filtrate was collected, concentrated, washed twice with cold ethanol, and dried in vacuum for 12 h to obtain a black brown solid product 17 with a yield of 60%.

Mass spectrometry: $C_{24}H_{26}FeN_2O_6$: [M+H]+: theoretical value: 495.1213; and measured value: 495.1215.

Elemental analysis: $C_{24}H_{26}FeN_2O_6$: theoretical values: 58.31% of C, 5.30% of H, and 5.67% of N; and measured values: 58.25% of C; 5.88% of H, and 5.95% of N.

Example 18. Preparation of Iron Pyridine Imine Complex Catalyst 18 (with the Structure Formula Below)

18

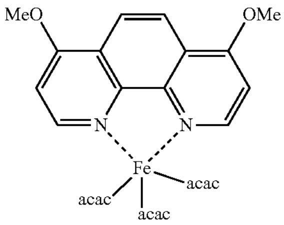

Under argon atmosphere, into a 50 mL Schlenk flask added was anhydrous $Fe(acac)_3$ (211.8 mg, 0.6 mmol), which was dissolved with 6 mL anhydrous ethanol at 60° C. Then a solution of 4,7-dimethoxy-1,10-phenanthroline (144.0 mg, 0.6 mmol) in ethanol (4 mL) was added dropwise into the system. The system was reacted at 60° C. for half an hour, and then returned to room temperature and stirred overnight. Filtration was conducted, and the filtrate was collected, concentrated, washed twice with cold ethanol, and dried in vacuum for 12 h to obtain a reddish orange solid product 18 with a yield of 65%.

Mass spectrometry: $C_{29}H_{33}FeN_2O_8$: [M+H]+: theoretical value: 594.1659; and measured value: 594.1660.

Elemental analysis: $C_{29}H_{33}FeN_2O_8$: theoretical values: 58.70% of C, 5.61% of H, and 4.72% of N; and measured values: 59.32% of C; 5.17% of H, and 5.06% of N.

Example 19. Preparation of Iron Pyridine Imine Complex Catalyst 19 (with the Structure Formula Below)

19

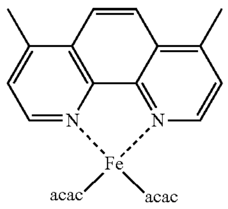

Under argon atmosphere, into a 50 mL Schlenk flask added was anhydrous $Fe(acac)_2$ (127.0 mg, 0.5 mmol), which was dissolved with 6 mL anhydrous ethanol at 60° C. Then a solution of 4,7-dimethyl-1,10-phenanthroline (104.0 mg, 0.5 mmol) in ethanol (4 mL) was added dropwise into the system. The system was reacted at 60° C. for half an hour, and then returned to room temperature and stirred overnight. Filtration was conducted, and the filtrate was collected, concentrated, washed twice with cold ethanol, and dried in vacuum for 12 h to obtain a black brown solid product 19 with a yield of 55%.

Mass spectrometry: $C_{24}H_{26}FeN_2O_4$: [M+H]+: theoretical value: 463.1315; and measured value: 463.1315.

Elemental analysis: $C_{24}H_{26}FeN_2O_4$: theoretical values: 62.35% of C, 5.67% of H, and 6.06% of N; and measured values: 61.58% of C, 5.45% of H, and 5.58% of N.

Example 20. Preparation of Iron Pyridine Imine Complex Catalyst 20 (with the Structure Formula Below)

20

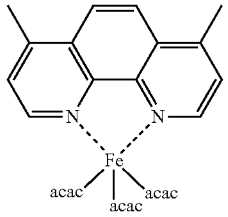

Under argon atmosphere, into a 50 mL Schlenk flask added was anhydrous $Fe(acac)_3$ (211.8 mg, 0.6 mmol), which was dissolved with 6 mL anhydrous ethanol at 60° C. Then a solution of 4,7-dimethyl-1,10-phenanthroline (124.8 mg, 0.6 mmol) in ethanol (4 mL) was added dropwise into the system. The system was reacted at 60° C. for half an hour, and then returned to room temperature and stirred overnight. Filtration was conducted, and the filtrate was collected, concentrated, washed twice with cold ethanol, and dried in vacuum for 12 h to obtain a reddish orange solid product 20 with a yield of 62%.

Mass spectrometry: $C_{29}H_{33}FeN_2O_6$: [M+H]+: theoretical value: 562.1716; and measured value: 562.1721.

Elemental analysis: $C_{29}H_{33}FeN_2O_6$: theoretical values: 62.04% of C, 5.92% of H, and 4.99% of N; and measured values: 61.68% of C, 6.08% of H, and 5.21% of N.

II. Use of Iron Bipyridine Complex in Polymerization of Conjugated Dienes

Example 21 (200)

Under argon atmosphere, into a 250 mL Schlenk flask sequentially added were 100 mL of anhydrous hexane and 10 mL of isoprene, the mixture was stirred for 1 min, then added with a prepared premix (under argon atmosphere, into a 25 mL Schlenk flask sequentially added were the catalyst 1 (4.1 mg, 10 μmol), 5 mL of toluene and MAO (2 mmol, 200 eq.), and the mixture was stirred for 1 min)). Polymerization was carried out at 25° C. for 120 min. The reaction was quenched with 50 mL of a solution of methanol in hydrochloric acid (MeOH/HCl=50/1), and added with 2 mL of the antiaging agent. The product was washed twice with ethanol to obtain a white solid polymer. Yield: >99%, number average molecular weight (Mn): 1.12 million, and molecular weight distribution (PDI): 1.8. Proportion of different structures: the cis-1,4-structure accounted for 25%, and the 3,4-structure accounted for 75%.

Example 22 (500)

Under argon atmosphere, into a 250 mL Schlenk flask sequentially added were 100 mL of anhydrous hexane and 10 mL of isoprene, the mixture was stirred for 1 min, then added with a prepared premix (under argon atmosphere, into a 25 mL Schlenk flask sequentially added were the catalyst 1 (4.1 mg, 10 μmol), 5 mL of toluene and MAO (5 mmol, 500 eq.), and the mixture was stirred for 1 min)). Polymerization was carried out at 25° C. for 120 min. The reaction was quenched with 50 mL of a solution of methanol in hydrochloric acid (MeOH/HCl=50/1), and added with 2 mL of the antiaging agent. The product was washed twice with ethanol to obtain a white solid polymer. Yield: >99%, number average molecular weight (Mn): 0.95 million, and molecular weight distribution (PDI): 2.2. Proportion of different structures: the cis-1,4-structure accounted for 24%, and the 3,4-structure accounted for 76%.

Example 23 (100)

Under argon atmosphere, into a 250 mL Schlenk flask sequentially added were 100 mL of anhydrous hexane and 10 mL of isoprene, the mixture was stirred for 1 min, then added with a prepared premix (under argon atmosphere, into a 25 mL Schlenk flask sequentially added were the catalyst 1 (4.1 mg, 10 μmol), 5 mL of toluene and MAO (1 mmol, 100 eq.), and the mixture was stirred for 1 min)). Polymerization was carried out at 25° C. for 120 min. The reaction was quenched with 50 mL of a solution of methanol in hydrochloric acid (MeOH/HCl=50/1), and added with 2 mL of the antiaging agent. The product was washed twice with ethanol to obtain a white solid polymer. Yield: >99%, number average molecular weight (Mn): 0.79 million, and molecular weight distribution (PDI): 2.8. Proportion of different structures: the cis-1,4-structure accounted for 25%, and the 3,4-structure accounted for 75%.

Example 24 (Toluene)

Under argon atmosphere, into a 250 mL Schlenk flask sequentially added were 100 mL of anhydrous toluene and 10 mL of isoprene, the mixture was stirred for 1 min, then added with a prepared premix (under argon atmosphere, into a 25 mL Schlenk flask sequentially added were the catalyst 1 (4.1 mg, 10 μmol), 5 mL of toluene and MAO (2 mmol, 200 eq.), and the mixture was stirred for 1 min)). Polymerization was carried out at 25° C. for 120 min. The reaction was quenched with 50 mL of a solution of methanol in hydrochloric acid (MeOH/HCl=50/1), and added with 2 mL of the antiaging agent. The product was washed twice with ethanol to obtain a white solid polymer. Yield: >99%, number average molecular weight (Mn): 1.56 million, and molecular weight distribution (PDI): 1.7. Proportion of different structures: the cis-1,4-structure accounted for 22%, and the 3,4-structure accounted for 78%.

Example 25 (Petroleum Ether)

Under argon atmosphere, into a 250 mL Schlenk flask sequentially added were 100 mL of anhydrous petroleum ether and 10 mL of isoprene, the mixture was stirred for 1 min, then added with a prepared premix (under argon atmosphere, into a 25 mL Schlenk flask sequentially added were the catalyst 1 (4.1 mg, 10 μmol), 5 mL of toluene and MAO (2 mmol, 200 eq.), and the mixture was stirred for 1 min)). Polymerization was carried out at 25° C. for 120 min. The reaction was quenched with 50 mL of a solution of methanol in hydrochloric acid (MeOH/HCl=50/1), and added with 2 mL of the antiaging agent. The product was washed twice with ethanol to obtain a white solid polymer. Yield: >99%, number average molecular weight (Mn): 1.24 million, and molecular weight distribution (PDI): 2.0. Proportion of different structures: the cis-1,4-structure accounted for 27%, and the 3,4-structure accounted for 73%.

Example 26 (Hexane/Pentane=1:1)

Under argon atmosphere, into a 250 mL Schlenk flask sequentially added were 100 mL of anhydrous hexane/pentane ($V_{hexane}$:$V_{pentane}$=1:1) and 10 mL of isoprene, the mixture was stirred for 1 min, then added with a prepared premix (under argon atmosphere, into a 25 mL Schlenk flask sequentially added were the catalyst 1 (4.1 mg, 10 μmol), 5 mL of toluene and MAO (2 mmol, 200 eq.), and the mixture was stirred for 1 min)). Polymerization was carried out at 25° C. for 120 min. The reaction was quenched with 50 mL of a solution of methanol in hydrochloric acid (MeOH/HCl=50/1), and added with 2 mL of the antiaging agent. The product was washed twice with ethanol to obtain a white solid polymer. Yield: >99%, number average molecular weight (Mn): 1.08 million, and molecular weight distribution (PDI): 1.8. Proportion of different structures: the cis-1,4-structure accounted for 29%, and the 3,4-structure accounted for 71%.

Example 27 (Cyclohexane)

Under argon atmosphere, into a 250 mL Schlenk flask sequentially added were 100 mL of anhydrous cyclohexane and 10 mL of isoprene, the mixture was stirred for 1 min, then added with a prepared premix (under argon atmosphere, into a 25 mL Schlenk flask sequentially added were the catalyst 1 (4.1 mg, 10 μmol), 5 mL of toluene and MAO (2 mmol, 200 eq.), and the mixture was stirred for 1 min)). Polymerization was carried out at 25° C. for 120 min. The reaction was quenched with 50 mL of a solution of methanol in hydrochloric acid (MeOH/HCl=50/1), and added with 2 mL of the antiaging agent. The product was washed twice with ethanol to obtain a white solid polymer. Yield: >99%, number average molecular weight (Mn): 1.15 million, and molecular weight distribution (PDI): 1.9. Proportion of different structures: the cis-1,4-structure accounted for 24%, and the 3,4-structure accounted for 76%.

Example 28 (0° C.)

Under argon atmosphere, into a 250 mL Schlenk flask sequentially added were 100 mL of anhydrous hexane and 10 mL of isoprene, the mixture was stirred for 1 min, then added with a prepared premix (under argon atmosphere, into a 25 mL Schlenk flask sequentially added were the catalyst 1 (4.1 mg, 10 μmol), 5 mL of toluene and MAO (2 mmol, 200 eq.), and the mixture was stirred for 1 min)). Polymerization was carried out at 0° C. for 120 min. The reaction was quenched with 50 mL of a solution of methanol in hydrochloric acid (MeOH/HCl=50/1), and added with 2 mL of the antiaging agent. The product was washed twice with ethanol to obtain a white solid polymer. Yield: >99%, number average molecular weight (Mn): 1.61 million, and molecular weight distribution (PDI): 1.3. Proportion of different structures: the cis-1,4-structure accounted for 22%, and the 3,4-structure accounted for 78%.

Example 29 (50° C.)

Under argon atmosphere, into a 250 mL Schlenk flask sequentially added were 100 mL of anhydrous hexane and 10 mL of isoprene, the mixture was stirred for 1 min, then added with a prepared premix (under argon atmosphere, into a 25 mL Schlenk flask sequentially added were the catalyst 1 (4.1 mg, 10 μmol), 5 mL of toluene and MAO (2 mmol, 200 eq.), and the mixture was stirred for 1 min)). Polymerization was carried out at 50° C. for 120 min. The reaction was quenched with 50 mL of a solution of methanol in hydrochloric acid (MeOH/HCl=50/1), and added with 2 mL of the antiaging agent. The product was washed twice with ethanol to obtain a white solid polymer. Yield: >99%, number average molecular weight (Mn): 1.12 million, and molecular weight distribution (PDI): 1.8. Proportion of different structures: the cis-1,4-structure accounted for 22%, the trans-1,4-structure accounted for 18%, and the 3,4-structure accounted for 60%.

Example 30 (10:1 of Allyl Chloride)

Under argon atmosphere, into a 250 mL Schlenk flask sequentially added were 100 mL of anhydrous hexane, 10 mL of isoprene, and allyl chloride (100 μmol, 10 eq.), the mixture was stirred for 1 min, then added with a prepared premix (under argon atmosphere, into a 25 mL Schlenk flask sequentially added were the catalyst 1 (4.1 mg, 10 μmol), 5 mL of toluene and MAO (2 mmol, 200 eq.), and the mixture was stirred for 1 min)). Polymerization was carried out at 25° C. for 120 min. The reaction was quenched with 50 mL of a solution of methanol in hydrochloric acid (MeOH/HCl=50/1), and added with 2 mL of the antiaging agent. The product was washed twice with ethanol to obtain a white solid polymer. Yield: >99%, number average molecular weight (Mn): 0.89 million, and molecular weight distribution (PDI): 1.7. Proportion of different structures: the cis-1,4-structure accounted for 23%, the trans-1,4-structure accounted for 4%, and the 3,4-structure accounted for 73%.

Example 31 (15:1 of Allyl Chloride)

Under argon atmosphere, into a 250 mL Schlenk flask sequentially added were 100 mL of anhydrous hexane, 10 mL of isoprene and allyl chloride (150 μmol, 15 eq.), the mixture was stirred for 1 min, then added with a prepared premix (under argon atmosphere, into a 25 mL Schlenk flask sequentially added were the catalyst 1 (4.1 mg, 10 μmol), 5 mL of toluene and MAO (2 mmol, 200 eq.), and the mixture was stirred for 1 min)). Polymerization was carried out at 25° C. for 120 min. The reaction was quenched with 50 mL of a solution of methanol in hydrochloric acid (MeOH/HCl=50/1), and added with 2 mL of the antiaging agent. The product was washed twice with ethanol to obtain a white solid polymer. Yield: >99%, number average molecular weight (Mn): 0.62 million, and molecular weight distribution (PDI): 2.0. Proportion of different structures: the cis-1,4-structure accounted for 24%, and the 3,4-structure accounted for 76%.

Example 32 (25:1 of Allyl Chloride)

Under argon atmosphere, into a 250 mL Schlenk flask sequentially added were 100 mL of anhydrous hexane, 10 mL of isoprene, and allyl chloride (250 μmol, 25 eq.), the mixture was stirred for 1 min, then added with a prepared premix (under argon atmosphere, into a 25 mL Schlenk flask sequentially added were the catalyst 1 (4.1 mg, 10 μmol), 5 mL of toluene and MAO (2 mmol, 200 eq.), and the mixture was stirred for 1 min)). Polymerization was carried out at 25° C. for 120 min. The reaction was quenched with 50 mL of a solution of methanol in hydrochloric acid (MeOH/HCl=50/1), and added with 2 mL of the antiaging agent. The product was washed twice with ethanol to obtain a white solid polymer. Yield: 33%, number average molecular weight (Mn): 0.51 million, and molecular weight distribution (PDI): 1.7. Proportion of different structures: the cis-1,4-structure accounted for 22%, and the 3,4-structure accounted for 78%.

Example 33 (15:1 of Triisobutylaluminum)

Under argon atmosphere, into a 250 mL Schlenk flask sequentially added were 100 mL of anhydrous hexane, 10 mL of isoprene and triisobutylaluminum (150 μmol, 15 eq.), the mixture was stirred for 1 min, then added with a prepared premix (under argon atmosphere, into a 25 mL Schlenk flask sequentially added were the catalyst 1 (4.1 mg, 10 μmol), 5 mL of toluene and MAO (2 mmol, 200 eq.), and the mixture was stirred for 1 min)). Polymerization was carried out at 25° C. for 120 min. The reaction was quenched with 50 mL of a solution of methanol in hydrochloric acid (MeOH/HCl=50/1), and added with 2 mL of the antiaging agent. The product was washed twice with ethanol to obtain a white solid polymer. Yield: >99%, number average molecular weight (Mn): 0.58 million, and molecular weight distribution (PDI): 2.0. Proportion of different structures: the cis-1,4-structure accounted for 21%, the trans-1,4-structure accounted for 7%, and the 3,4-structure accounted for 72%.

Example 34 (15:1 of Triethyl Aluminum)

Under argon atmosphere, into a 250 mL Schlenk flask sequentially added were 100 mL of anhydrous hexane, 10 mL of isoprene and triethyl aluminum (150 μmol, 15 eq.), the mixture was stirred for 1 min, then added with a prepared premix (under argon atmosphere, into a 25 mL Schlenk flask sequentially added were the catalyst 1 (4.1 mg, 10 μmol), 5 mL of toluene and MAO (2 mmol, 200 eq.), and the mixture was stirred for 1 min)). Polymerization was carried out at 25° C. for 120 min. The reaction was quenched with 50 mL of a solution of methanol in hydrochloric acid (MeOH/HCl=50/1), and added with 2 mL of the antiaging agent. The product was washed twice with ethanol to obtain a white solid polymer. Yield: >99%, number average molecular weight (Mn): 0.52 million, and molecular weight distribution (PDI): 2.1. Proportion of different structures: the cis-1,4-structure accounted for 20%, the trans-1,4-structure accounted for 8%, and the 3,4-structure accounted for 72%.

Example 35 (15:1 of Diethylsilane)

Under argon atmosphere, into a 250 mL Schlenk flask sequentially added were 100 mL of anhydrous hexane, 10 mL of isoprene and diethylsilane (150 μmol, 15 eq.), the mixture was stirred for 1 min, then added with a prepared premix (under argon atmosphere, into a 25 mL Schlenk flask sequentially added were the catalyst 1 (4.1 mg, 10 μmol), 5 mL of toluene and MAO (2 mmol, 200 eq.), and the mixture was stirred for 1 min)). Polymerization was carried out at 25° C. for 120 min. The reaction was quenched with 50 mL of a solution of methanol in hydrochloric acid (MeOH/HCl=50/1), and added with 2 mL of the antiaging agent. The product was washed twice with ethanol to obtain a white solid polymer. Yield: >99%, number average molecular weight (Mn): 0.70 million, and molecular weight distribution (PDI): 2.0. Proportion of different structures: the cis-1,4-structure accounted for 21%, the trans-1,4-structure accounted for 7%, and the 3,4-structure accounted for 72%.

Example 36 (with the Molar Ratio of Isoprene to Iron Bipyridine Complex being 5000:1)

Under argon atmosphere, into a 250 mL Schlenk flask sequentially added were 50 mL of anhydrous hexane and 5 mL of isoprene, the mixture was stirred for 1 min, then added with a prepared premix (under argon atmosphere, into a 25 mL Schlenk flask sequentially added were the catalyst 1 (4.1 mg, 10 μmol), 5 mL of toluene and MAO (2 mmol, 200 eq.), and the mixture was stirred for 1 min)). Polymerization was carried out at 25° C. for 120 min. The reaction was quenched with 50 mL of a solution of methanol in hydrochloric acid (MeOH/HCl=50/1), and added with 2 mL of the antiaging agent. The product was washed twice with ethanol to obtain a white solid polymer. Yield: >99%, number average molecular weight (Mn): 0.68 million, and molecular weight distribution (PDI): 2.2. Proportion of different structures: the cis-1,4-structure accounted for 29%, and the 3,4-structure accounted for 71%.

Example 37 (with the Molar Ratio of Isoprene to Iron Bipyridine Complex being 15000:1)

Under argon atmosphere, into a 250 mL Schlenk flask sequentially added were 150 mL of anhydrous hexane and 15 mL of isoprene, the mixture was stirred for 1 min, then added with a prepared premix (under argon atmosphere, into a 25 mL Schlenk flask sequentially added were the catalyst 1 (4.1 mg, 10 μmol), 5 mL of toluene and MAO (2 mmol, 200 eq.), and the mixture was stirred for 1 min)). Polymerization was carried out at 25° C. for 120 min. The reaction was quenched with 50 mL of a solution of methanol in hydrochloric acid (MeOH/HCl=50/1), and added with 2 mL of the antiaging agent. The product was washed twice with ethanol to obtain a white solid polymer. Yield: >99%, number average molecular weight (Mn): 1.98 million, and molecular weight distribution (PDI): 1.6. Proportion of different structures: the cis-1,4-structure accounted for 25%, and the 3,4-structure accounted for 75%.

Example 38 (with the Molar Ratio of Isoprene to Iron Bipyridine Complex being 20000:1)

Under argon atmosphere, into a 250 mL Schlenk flask sequentially added were 200 mL of anhydrous hexane and 20 mL of isoprene, the mixture was stirred for 1 min, then added with a prepared premix (under argon atmosphere, into a 25 mL Schlenk flask sequentially added were the catalyst 1 (4.1 mg, 10 μmol), 5 mL of toluene and MAO (5 mmol, 500 eq.), and the mixture was stirred for 1 min)). Polymerization was carried out at 25° C. for 120 min. The reaction was quenched with 50 mL of a solution of methanol in hydrochloric acid (MeOH/HCl=50/1), and added with 2 mL of the antiaging agent. The product was washed twice with ethanol to obtain a white solid polymer. Yield: 80%, number average molecular weight (Mn): 1.76 million, and molecular weight distribution (PDI): 1.5. Proportion of different structures: the cis-1,4-structure accounted for 22%, and the 3,4-structure accounted for 78%.

Example 39 (Catalyst 2)

Under argon atmosphere, into a 250 mL Schlenk flask sequentially added were 100 mL of anhydrous hexane and 10 mL of isoprene, the mixture was stirred for 1 min, then added with a prepared premix (under argon atmosphere, into a 25 mL Schlenk flask sequentially added were the catalyst 2 (5.1 mg, 10 μmol), 5 mL of toluene and MAO (2 mmol, 200 eq.), and the mixture was stirred for 1 min)). Polymerization was carried out at 25° C. for 120 min. The reaction was quenched with 50 mL of a solution of methanol in hydrochloric acid (MeOH/HCl=50/1), and added with 2 mL of the antiaging agent. The product was washed twice with ethanol to obtain a white solid polymer. Yield: >99%, number average molecular weight (Mn): 1.14 million, and molecular weight distribution (PDI): 1.6. Proportion of different structures: the cis-1,4-structure accounted for 28%, and the 3,4-structure accounted for 72%.

Example 40 (Catalyst 3)

Under argon atmosphere, into a 250 mL Schlenk flask sequentially added were 100 mL of anhydrous hexane and 10 mL of isoprene, the mixture was stirred for 1 min, then added with a prepared premix (under argon atmosphere, into a 25 mL Schlenk flask sequentially added were the catalyst 3 (4.4 mg, 10 μmol), 5 mL of toluene and MAO (2 mmol, 200 eq.), and the mixture was stirred for 1 min)). Polymerization was carried out at 25° C. for 120 min. The reaction was quenched with 50 mL of a solution of methanol in hydrochloric acid (MeOH/HCl=50/1), and added with 2 mL of the antiaging agent. The product was washed twice with ethanol to obtain a white solid polymer. Yield: 90%, number average molecular weight (Mn): 0.89 million, and molecular weight distribution (PDI): 1.8. Proportion of different structures: the cis-1,4-structure accounted for 24%, and the 3,4-structure accounted for 76%.

Example 41 (Catalyst 4)

Under argon atmosphere, into a 250 mL Schlenk flask sequentially added were 100 mL of anhydrous hexane and 10 mL of isoprene, the mixture was stirred for 1 min, then added with a prepared premix (under argon atmosphere, into a 25 mL Schlenk flask sequentially added were the catalyst 4 (5.4 mg, 10 μmol), 5 mL of toluene and MAO (2 mmol, 200 eq.), and the mixture was stirred for 1 min)). Polymerization was carried out at 25° C. for 120 min. The reaction was quenched with 50 mL of a solution of methanol in hydrochloric acid (MeOH/HCl=50/1), and added with 2 mL of the antiaging agent. The product was washed twice with ethanol to obtain a white solid polymer. Yield: >99%, number average molecular weight (Mn): 1.04 million, and molecular weight distribution (PDI): 1.9. Proportion of different structures: the cis-1,4-structure accounted for 32%, and the 3,4-structure accounted for 68%.

Example 42 (Catalyst 5)

Under argon atmosphere, into a 250 mL Schlenk flask sequentially added were 100 mL of anhydrous hexane and 10 mL of isoprene, the mixture was stirred for 1 min, then added with a prepared premix (under argon atmosphere, into a 25 mL Schlenk flask sequentially added were the catalyst 5 (4.4 mg, 10 μmol), 5 mL of toluene and MAO (2 mmol, 200 eq.), and the mixture was stirred for 1 min)). Polymerization was carried out at 25° C. for 120 min. The reaction was quenched with 50 mL of a solution of methanol in hydrochloric acid (MeOH/HCl=50/1), and added with 2 mL of the antiaging agent. The product was washed twice with ethanol to obtain a white solid polymer. Yield: 95%, number average molecular weight (Mn): 0.96 million, and molecular weight distribution (PDI): 2.0. Proportion of different structures: the cis-1,4-structure accounted for 27%, and the 3,4-structure accounted for 73%.

Example 43 (Catalyst 6)

Under argon atmosphere, into a 250 mL Schlenk flask sequentially added were 100 mL of anhydrous hexane and 10 mL of isoprene, the mixture was stirred for 1 min, then added with a prepared premix (under argon atmosphere, into a 25 mL Schlenk flask sequentially added were the catalyst 6 (5.4 mg, 10 μmol), 5 mL of toluene and MAO (2 mmol, 200 eq.), and the mixture was stirred for 1 min)). Polymerization was carried out at 25° C. for 120 min. The reaction was quenched with 50 mL of a solution of methanol in hydrochloric acid (MeOH/HCl=50/1), and added with 2 mL of the antiaging agent. The product was washed twice with ethanol to obtain a white solid polymer. Yield: >99%, number average molecular weight (Mn): 1.21 million, and molecular weight distribution (PDI): 1.8. Proportion of different structures: the cis-1,4-structure accounted for 32%, and the 3,4-structure accounted for 68%.

Example 44 (Catalyst 7)

Under argon atmosphere, into a 250 mL Schlenk flask sequentially added were 100 mL of anhydrous hexane and 10 mL of isoprene, the mixture was stirred for 1 min, then added with a prepared premix (under argon atmosphere, into a 25 mL Schlenk flask sequentially added were the catalyst 7 (4.4 mg, 10 μmol), 5 mL of toluene and MAO (2 mmol, 200 eq.), and the mixture was stirred for 1 min)). Polymerization was carried out at 25° C. for 120 min. The reaction was quenched with 50 mL of a solution of methanol in hydrochloric acid (MeOH/HCl=50/1), and added with 2 mL of the antiaging agent. The product was washed twice with ethanol to obtain a white solid polymer. Yield: 32%, number average molecular weight (Mn): 0.50 million, and molecular weight distribution (PDI): 2.8. Proportion of different structures: the cis-1,4-structure accounted for 40%, and the 3,4-structure accounted for 60%.

Example 45 (Catalyst 8)

Under argon atmosphere, into a 250 mL Schlenk flask sequentially added were 100 mL of anhydrous hexane and 10 mL of isoprene, the mixture was stirred for 1 min, then added with a prepared premix (under argon atmosphere, into a 25 mL Schlenk flask sequentially added were the catalyst 8 (5.4 mg, 10 μmol), 5 mL of toluene and MAO (2 mmol, 200 eq.), and the mixture was stirred for 1 min)). Polymerization was carried out at 25° C. for 120 min. The reaction was quenched with 50 mL of a solution of methanol in hydrochloric acid (MeOH/HCl=50/1), and added with 2 mL of the antiaging agent. The product was washed twice with ethanol to obtain a white solid polymer. Yield: 40%, number average molecular weight (Mn): 0.62 million, and molecular weight distribution (PDI): 2.3. Proportion of different structures: the cis-1,4-structure accounted for 35%, and the 3,4-structure accounted for 65%.

Example 46 (Catalyst 9)

Under argon atmosphere, into a 250 mL Schlenk flask sequentially added were 100 mL of anhydrous hexane and 10 mL of isoprene, the mixture was stirred for 1 min, then added with a prepared premix (under argon atmosphere, into a 25 mL Schlenk flask sequentially added were the catalyst 9 (4.7 mg, 10 μmol), 5 mL of toluene and MAO (2 mmol, 200 eq.), and the mixture was stirred for 1 min)). Polymerization was carried out at 25° C. for 120 min. The reaction was quenched with 50 mL of a solution of methanol in hydrochloric acid (MeOH/HCl=50/1), and added with 2 mL of the antiaging agent. The product was washed twice with ethanol to obtain a white solid polymer. Yield: 30%, number average molecular weight (Mn): 0.52 million, and molecular weight distribution (PDI): 2.5. Proportion of different structures: the cis-1,4-structure accounted for 25%, the trans-1,4-structure accounted for 14%, and the 3,4-structure accounted for 61%.

Example 47 (Catalyst 10)

Under argon atmosphere, into a 250 mL Schlenk flask sequentially added were 100 mL of anhydrous hexane and 10 mL of isoprene, the mixture was stirred for 1 min, then added with a prepared premix (under argon atmosphere, into a 25 mL Schlenk flask sequentially added were the catalyst 10 (5.7 mg, 10 μmol), 5 mL of toluene and MAO (2 mmol, 200 eq.), and the mixture was stirred for 1 min)). Polymerization was carried out at 25° C. for 120 min. The reaction was quenched with 50 mL of a solution of methanol in hydrochloric acid (MeOH/HCl=50/1), and added with 2 mL of the antiaging agent. The product was washed twice with ethanol to obtain a white solid polymer. Yield: 39%, number average molecular weight (Mn): 0.58 million, and molecular weight distribution (PDI): 1.8. Proportion of different structures: the cis-1,4-structure accounted for 20%, the trans-1,4-structure accounted for 14%, and the 3,4-structure accounted for 66%.

Example 48 (Catalyst 11)

Under argon atmosphere, into a 250 mL Schlenk flask sequentially added were 100 mL of anhydrous hexane and 10 mL of isoprene, the mixture was stirred for 1 min, then added with a prepared premix (under argon atmosphere, into a 25 mL Schlenk flask sequentially added were the catalyst 11 (5.0 mg, 10 μmol), 5 mL of toluene and MAO (2 mmol, 200 eq.), and the mixture was stirred for 1 min)). Polymerization was carried out at 25° C. for 120 min. The reaction was quenched with 50 mL of a solution of methanol in hydrochloric acid (MeOH/HCl=50/1), and added with 2 mL of the antiaging agent. The product was washed twice with ethanol to obtain a white solid polymer. Yield: 95%, number average molecular weight (Mn): 1.20 million, and molecular weight distribution (PDI): 2.0. Proportion of different structures: the cis-1,4-structure accounted for 37%, and the 3,4-structure accounted for 63%.

Example 49 (Catalyst 12)

Under argon atmosphere, into a 250 mL Schlenk flask sequentially added were 100 mL of anhydrous hexane and 10 mL of isoprene, the mixture was stirred for 1 min, then added with a prepared premix (under argon atmosphere, into a 25 mL Schlenk flask sequentially added were the catalyst 12 (6.0 mg, 10 μmol), 5 mL of toluene and MAO (2 mmol, 200 eq.), and the mixture was stirred for 1 min)). Polymerization was carried out at 25° C. for 120 min. The reaction was quenched with 50 mL of a solution of methanol in hydrochloric acid (MeOH/HCl=50/1), and added with 2 mL of the antiaging agent. The product was washed twice with ethanol to obtain a white solid polymer. Yield: >99%, number average molecular weight (Mn): 1.13 million, and molecular weight distribution (PDI): 1.8. Proportion of different structures: the cis-1,4-structure accounted for 34%, and the 3,4-structure accounted for 66%.

Example 50 (Catalyst 13)

Under argon atmosphere, into a 250 mL Schlenk flask sequentially added were 100 mL of anhydrous hexane and 10 mL of isoprene, the mixture was stirred for 1 min, then added with a prepared premix (under argon atmosphere, into a 25 mL Schlenk flask sequentially added were the catalyst 13 (4.4 mg, 10 μmol), 5 mL of toluene and MAO (2 mmol, 200 eq.), and the mixture was stirred for 1 min)). Polymerization was carried out at 25° C. for 120 min. The reaction was quenched with 50 mL of a solution of methanol in hydrochloric acid (MeOH/HCl=50/1), and added with 2 mL of the antiaging agent. The product was washed twice with ethanol to obtain a white solid polymer. Yield: >99%, number average molecular weight (Mn): 1.30 million, and molecular weight distribution (PDI): 1.9. Proportion of different structures: the cis-1,4-structure accounted for 23%, and the 3,4-structure accounted for 77%.

Example 51 (Catalyst 14)

Under argon atmosphere, into a 250 mL Schlenk flask sequentially added were 100 mL of anhydrous hexane and 10 mL of isoprene, the mixture was stirred for 1 min, then added with a prepared premix (under argon atmosphere, into a 25 mL Schlenk flask sequentially added were the catalyst 14 (5.4 mg, 10 μmol), 5 mL of toluene and MAO (2 mmol, 200 eq.), and the mixture was stirred for 1 min)). Polymerization was carried out at 25° C. for 120 min. The reaction was quenched with 50 mL of a solution of methanol in hydrochloric acid (MeOH/HCl=50/1), and added with 2 mL of the antiaging agent. The product was washed twice with ethanol to obtain a white solid polymer. Yield: >99%, number average molecular weight (Mn): 1.38 million, and molecular weight distribution (PDI): 2.1. Proportion of different structures: the cis-1,4-structure accounted for 25%, and the 3,4-structure accounted for 75%.

Example 52 (Catalyst 15)

Under argon atmosphere, into a 250 mL Schlenk flask sequentially added were 100 mL of anhydrous hexane and 10 mL of isoprene, the mixture was stirred for 1 min, then added with a prepared premix (under argon atmosphere, into a 25 mL Schlenk flask sequentially added were the catalyst 15 (5.9 mg, 10 μmol), 5 mL of toluene and MAO (2 mmol, 200 eq.), and the mixture was stirred for 1 min)). Polymerization was carried out at 25° C. for 120 min. The reaction was quenched with 50 mL of a solution of methanol in hydrochloric acid (MeOH/HCl=50/1), and added with 2 mL of the antiaging agent. The product was washed twice with ethanol to obtain a white solid polymer. Yield: 72%, number average molecular weight (Mn): 0.95 million, and molecular weight distribution (PDI): 2.2. Proportion of different structures: the cis-1,4-structure accounted for 30%, and the 3,4-structure accounted for 70%.

Example 53 (Catalyst 16)

Under argon atmosphere, into a 250 mL Schlenk flask sequentially added were 100 mL of anhydrous hexane and 10 mL of isoprene, the mixture was stirred for 1 min, then added with a prepared premix (under argon atmosphere, into a 25 mL Schlenk flask sequentially added were the catalyst 16 (6.9 mg, 10 μmol), 5 mL of toluene and MAO (2 mmol, 200 eq.), and the mixture was stirred for 1 min)). Polymerization was carried out at 25° C. for 120 min. The reaction was quenched with 50 mL of a solution of methanol in hydrochloric acid (MeOH/HCl=50/1), and added with 2 mL of the antiaging agent. The product was washed twice with ethanol to obtain a white solid polymer. Yield: 75%, number average molecular weight (Mn): 0.88 million, and molecular weight distribution (PDI): 1.7. Proportion of different structures: the cis-1,4-structure accounted for 32%, and the 3,4-structure accounted for 68%.

Example 54 (Catalyst 17)

Under argon atmosphere, into a 250 mL Schlenk flask sequentially added were 100 mL of anhydrous hexane and 10 mL of isoprene, the mixture was stirred for 1 min, then added with a prepared premix (under argon atmosphere, into a 25 mL Schlenk flask sequentially added were the catalyst 17 (4.9 mg, 10 μmol), 5 mL of toluene and MAO (2 mmol, 200 eq.), and the mixture was stirred for 1 min)). Polymerization was carried out at 25° C. for 120 min. The reaction was quenched with 50 mL of a solution of methanol in hydrochloric acid (MeOH/HCl=50/1), and added with 2 mL of the antiaging agent. The product was washed twice with ethanol to obtain a white solid polymer. Yield: 54%, number average molecular weight (Mn): 0.56 million, and molecular weight distribution (PDI): 2.5. Proportion of different structures: the cis-1,4-structure accounted for 30%, and the 3,4-structure accounted for 70%.

Example 55 (Catalyst 18)

Under argon atmosphere, into a 250 mL Schlenk flask sequentially added were 100 mL of anhydrous hexane and 10 mL of isoprene, the mixture was stirred for 1 min, then added with a prepared premix (under argon atmosphere, into a 25 mL Schlenk flask sequentially added were the catalyst 18 (5.9 mg, 10 μmol), 5 mL of toluene and MAO (2 mmol, 200 eq.), and the mixture was stirred for 1 min)). Polymerization was carried out at 25° C. for 120 min. The reaction was quenched with 50 mL of a solution of methanol in hydrochloric acid (MeOH/HCl=50/1), and added with 2 mL of the antiaging agent. The product was washed twice with ethanol to obtain a white solid polymer. Yield: 58%, number average molecular weight (Mn): 0.91 million, and molecular weight distribution (PDI): 2.4. Proportion of different structures: the cis-1,4-structure accounted for 34%, and the 3,4-structure accounted for 66%.

Example 56 (Catalyst 19)

Under argon atmosphere, into a 250 mL Schlenk flask sequentially added were 100 mL of anhydrous hexane and 10 mL of isoprene, the mixture was stirred for 1 min, then added with a prepared premix (under argon atmosphere, into a 25 mL Schlenk flask sequentially added were the catalyst 19 (4.6 mg, 10 μmol), 5 mL of toluene and MAO (2 mmol, 200 eq.), and the mixture was stirred for 1 min)). Polymerization was carried out at 25° C. for 120 min. The reaction was quenched with 50 mL of a solution of methanol in hydrochloric acid (MeOH/HCl=50/1), and added with 2 mL of the antiaging agent. The product was washed twice with ethanol to obtain a white solid polymer. Yield: 86%, number average molecular weight (Mn): 1.25 million, and molecular weight distribution (PDI): 2.2. Proportion of different structures: the cis-1,4-structure accounted for 32%, and the 3,4-structure accounted for 68%.

Example 57 (Catalyst 20)

Under argon atmosphere, into a 250 mL Schlenk flask sequentially added were 100 mL of anhydrous hexane and 10 mL of isoprene, the mixture was stirred for 1 min, then added with a prepared premix (under argon atmosphere, into a 25 mL Schlenk flask sequentially added were the catalyst 20 (5.6 mg, 10 μmol), 5 mL of toluene and MAO (2 mmol, 200 eq.), and the mixture was stirred for 1 min)). Polymerization was carried out at 25° C. for 120 min. The reaction was quenched with 50 mL of a solution of methanol in hydrochloric acid (MeOH/HCl=50/1), and added with 2 mL of the antiaging agent. The product was washed twice with ethanol to obtain a white solid polymer. Yield: 85%, number average molecular weight (Mn): 0.96 million, and molecular weight distribution (PDI): 1.8. Proportion of different structures: the cis-1,4-structure accounted for 28%, and the 3,4-structure accounted for 72%.

Example 58 (Butadiene)

Under argon atmosphere, into a 250 mL Schlenk flask sequentially added were 100 mL of anhydrous hexane and 10 mL of butadiene, the mixture was stirred for 1 min, then added with a prepared premix (under argon atmosphere, into a 25 mL Schlenk flask sequentially added were the catalyst 1 (4.1 mg, 10 μmol), 5 mL of toluene and MAO (2 mmol, 200 eq.), and the mixture was stirred for 1 min)). Polymerization was carried out at 25° C. for 120 min. The reaction was quenched with 50 mL of a solution of methanol in hydrochloric acid (MeOH/HCl=50/1), and added with 2 mL of the antiaging agent. The product was washed twice with ethanol to obtain a white solid polymer. Yield: >99%, number average molecular weight (Mn): 1.20 million, and molecular weight distribution (PDI): 1.7. Proportion of different structures: the cis-1,4-structure accounted for 25%, and the 1,2-structure accounted for 75%.

Example 59 (Isoprene, Butadiene)

Under argon atmosphere, into a 250 mL Schlenk flask sequentially added were 100 mL of anhydrous hexane, 5 mL of isoprene and 5 mL of butadiene, the mixture was stirred for 1 min, then added with a prepared premix (under argon atmosphere, into a 25 mL Schlenk flask sequentially added were the catalyst 1 (4.1 mg, 10 μmol), 5 mL of toluene and MAO (2 mmol, 200 eq.), and the mixture was stirred for 1 min)). Polymerization was carried out at 25° C. for 120 min. The reaction was quenched with 50 mL of a solution of methanol in hydrochloric acid (MeOH/HCl=50/1), and added with 2 mL of the antiaging agent. The product was washed twice with ethanol to obtain a white solid polymer. Yield: >99%, number average molecular weight (Mn): 1.81 million, and molecular weight distribution (PDI): 1.4. Proportion of different structures: isoprene segment:butadiene segment=1:1. In the isoprene segment: the cis-1,4-structure accounted for 28%, and the 3,4-structure accounted for 72%. In the butadiene segment, the cis-1,4-structure accounted for 32%, and the 1,2-structure accounted for 68%.

Example 60 (Isoprene, Three Components, Triisobutylaluminum)

Under argon atmosphere, into a 250 mL Schlenk flask sequentially added were 50 mL of anhydrous hexane and 5 mL of isoprene, the mixture was stirred for 1 min, then added with a prepared premix (under argon atmosphere, into a 25 mL Schlenk flask sequentially added were the catalyst 1 (4.1 mg, 10 μmol), 5 mL of toluene, $Al(i\text{-}Bu)_3$ (500 μmol, 50 eq.), and $[CPh_3]^+[B(C_6F_5)_4]^-$ (10 μmol, 1 eq.), and the mixture was stirred for 1 min)). Polymerization was carried out at 25° C. for 120 min. The reaction was quenched with 50 mL of a solution of methanol in hydrochloric acid (MeOH/HCl=50/1), and added with 2 mL of the antiaging agent. The product was washed twice with ethanol to obtain a white solid polymer. Yield: >99%, number average molecular weight (Mn): 0.88 million, and molecular weight distribution (PDI): 2.4. Proportion of different structures: the cis-1,4-structure accounted for 25%, and the 3,4-structure accounted for 75%.

The invention claimed is:

1. A method for polymerizing the conjugated dienes comprising the following method:

under an inert gas atmosphere a solvent and a conjugated diene monomer are sequentially added into a reactor and stirred, then added with a catalyst system premix, polymerized at a constant temperature of −40° C.-50° C. for 10 min-720 min, added with a quencher and an antiaging agent after the reaction is finished, washed with ethanol, and separated and purified to obtain a poly(conjugated diene) product; wherein the catalyst system premix is prepared from an iron bipyridine complex and a cocatalyst or prepared from the iron bipyridine complex, a cocatalyst and a dealkylation reagent;

wherein the aniron bipyridine complex has a structural formula of any one of the following formulas:

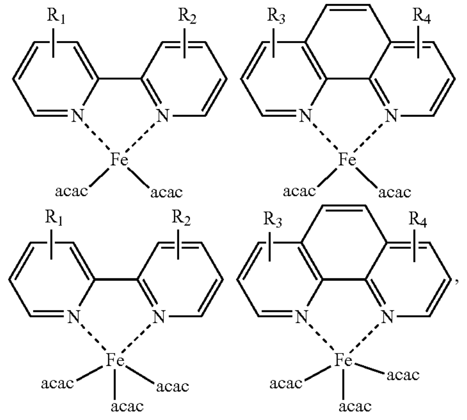

wherein $R_1$, $R_2$, $R_3$ and $R_4$ are the same or different; $R_1$, $R_2$, $R_3$ and $R_4$ respectively represent any one of H, $CH_3$, phenyl, methoxy or nitro.

2. The method according to claim 1, wherein the conjugated diene monomer is one or a mixture of two of isoprene and butadiene; and the solvent is one or a mixture of more than two of toluene, n-hexane, cyclohexane, pentane, petroleum ether and hydrogenated gasoline.

3. The method according to claim 1, wherein the cocatalyst is one or a mixture of more than two of methylaluminoxane (MAO), modified methylaluminoxane (MMAO), aluminium diethyl monochloride ($ClAlEt_2$), sesquiethylaluminum (SEAC), trimethyl aluminum ($AlMe_3$), triethylaluminum ($AlEt_3$), triisobutyl aluminum ($AliBu_3$), and the general molecular formula of MAO is

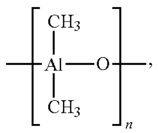

wherein n is a natural number of 4-40; and the dealkylation reagent is one of borates $[CPh_3]^+[B(C_6F_5)_4]$, $[NH_2Ph_2]^+[B(C_6F_5)_4]$ or $[NH_2Me_2]^+[B(C_6F_5)_4]$.

4. The method according to claim 1, wherein when the catalyst system premix is prepared from the iron bipyridine complex and the cocatalyst, a molar ratio of the cocatalyst to the iron bipyridine complex is in a rang of (5-1000):1; a molar ratio of the conjugated diene monomer to the iron bipyridine complex is in a range of (1250-25000):1; and a volume ratio of the conjugated diene monomer to the solvent is in a range of 1:(2-50).

5. The method according to claim 1, wherein when the catalyst system premix is prepared from the iron bipyridine complex, the cocatalyst and the dealkylation reagent, a molar ratio of the cocatalyst to the iron bipyridine complex is in a range of (5-200):1; a molar ratio of the conjugated diene monomer to the iron bipyridine complex is in a range of (1250-10000):1, and a volume ratio of the conjugated diene monomer to the solvent is in a range of 1:(2-50); and a molar ratio of the dealkylation reagent to the iron bipyridine complex is in a range of (1-10):1.

6. The method according to claim 1, wherein when the solvent and the conjugated diene monomer are added into the reactor, a chain transfer reagent is also added to adjust the molecular weight, wherein the chain transfer reagent is one of allyl chloride, allyl bromide, diethylsilane, triphenylsilane, trimethylsilane, triethylaluminum and triisobutylaluminum, and a molar ratio of the chain transfer reagent to the iron bipyridine complex is in a range of (1-50):1.

7. The method according to claim 1, wherein a catalytic system comprising the iron bipyridine complex, the cocatalyst and/or the dealkylation reagent is prepared into a premix immediately before use, and the method for preparing the premix is as follows: under an inert gas atmosphere, toluene, the iron bipyridine complex (1 equiv.) and the cocatalyst (10-1000 equiv.) are added sequentially into a 25 mL Schlenk flask and stirred for 1 min; or alternatively toluene, the iron bipyridine complex (1 equiv.), the cocatalyst (5-200 equiv.) and the dealkylation reagent (1-10 equiv.) are added sequentially into a 25 mL Schlenk flask and stirred for 1 min.

8. The method according to claim 1, wherein the poly(conjugated diene) prepared by the method has a molecular weight of 500,000-2,000,000, a molecular weight distribution of 1.5-8.0; a proportion of cis-1,4 structure of 20%-40%, a proportion of trans-1,4 structure of 0%-20%, and a proportion of 3,4-(1,2-) structure of 60%-80%.

9. A method for polymerizing the conjugated dienes comprising the following methods:

under an inert gas atmosphere a solvent and a conjugated diene monomer are sequentially added into a reactor and stirred, then added with a catalyst system premix, polymerized at a constant temperature of −40° C.-50° C. for 10 min-720 min, added with a quencher and an antiaging agent after the reaction is finished, washed with ethanol, and separated and purified to obtain a poly(conjugated diene) product; wherein the catalyst system premix is prepared from an iron bipyridine complex and a cocatalyst or prepared from the iron bipyridine complex, a cocatalyst and a dealkylation reagent;

wherein the aniron bipyridine complex has a structural formula of any one of the following formulas:

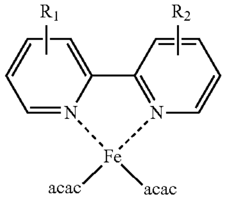

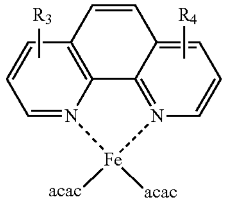

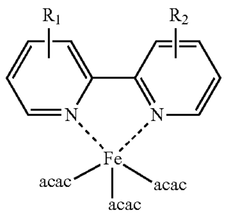

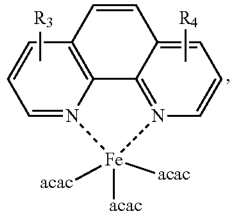

wherein $R_1$, $R_2$, $R_3$ and $R_4$ are the same or different; $R_1$, $R_2$, $R_3$ and $R_4$ respectively represent any one of H, $CH_3$, phenyl, methoxy or nitro; and the structural formula of the iron bipyridine complex is any one of the following formulas:

9

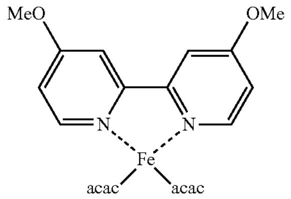

10

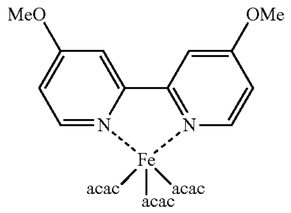

11

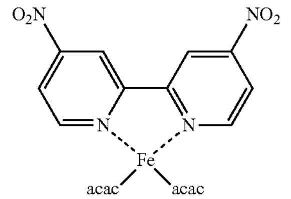

12

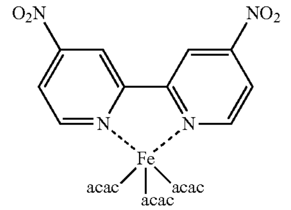

13

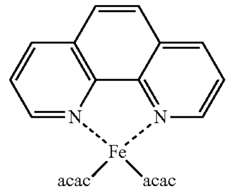

14

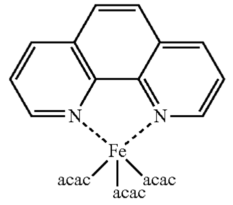

15

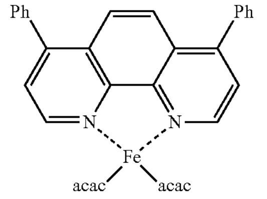

-continued

16

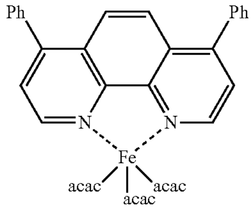

1

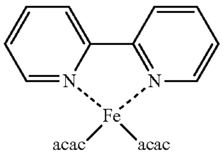

2

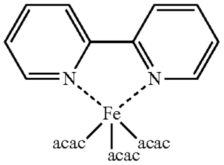

3

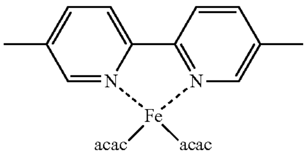

4

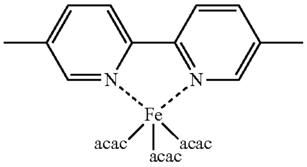

5

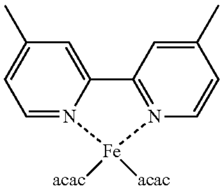

6

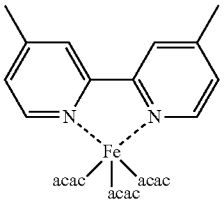

7

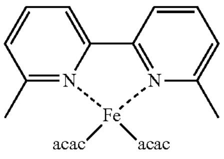

-continued

8

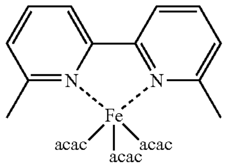

17

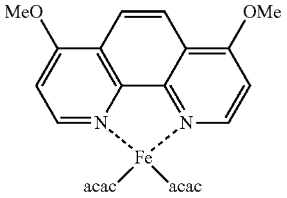

18

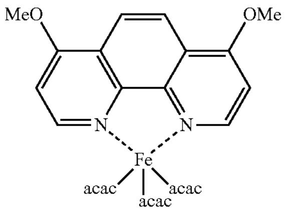

19

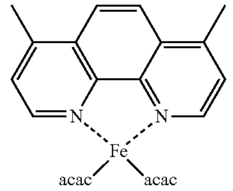

20

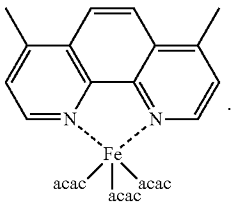

10. The method according to claim 9, wherein the conjugated diene monomer is one or a mixture of two of isoprene and butadiene; and the solvent is one or a mixture of more than two of toluene, n-hexane, cyclohexane, pentane, petroleum ether and hydrogenated gasoline.

11. The method according to claim 9, wherein the cocatalyst is one or a mixture of more than two of methylaluminoxane (MAO), modified methylaluminoxane (MMAO), aluminium diethyl monochloride ($ClAlEt_2$), sesquiethylaluminumchloride (SEAC), trimethyl aluminum ($AlMe_3$), triethylaluminum ($AlEt_3$), triisobutyl aluminum ($AliBu_3$), and the general molecular formula of MAO is

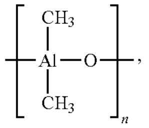

wherein n is a natural number of 4-40; and the dealkylation reagent is one of borates $[CPh_3]^+[B(C_6F_5)_4]$, $[NH_2Ph_2]^+[B(C_6F_5)_4]$ or $[NH_2Me_2]^+[B(C_6F_5)_4]$.

12. The method according to claim 9, wherein when the catalyst system premix is prepared from the iron bipyridine complex and the cocatalyst, a molar ratio of the cocatalyst to the iron bipyridine complex is in a range of (5-1000):1; a molar ratio of the conjugated diene monomer to the iron bipyridine complex is in a range of (1250-25000):1; and a volume ratio of the conjugated diene monomer to the solvent is in a range of 1:(2-50).

13. The method according to claim 9, wherein when the catalyst system premix is prepared from the iron bipyridine complex, the cocatalyst and the dealkylation reagent, a molar ratio of the cocatalyst to the iron bipyridine complex is in a range of (5-200):1; a molar ratio of the conjugated diene monomer to the iron bipyridine complex is in a range of (1250-10000):1, and a volume ratio of the conjugated diene monomer to the solvent is in a range of 1:(2-50); and a molar ratio of the dealkylation reagent to the iron bipyridine complex is in a range of (1-10):1.

14. The method according to claim 9, wherein when the solvent and the conjugated diene monomer are added into the reactor, a chain transfer reagent is also added to adjust the molecular weight, wherein the chain transfer reagent is one of allyl chloride, allyl bromide, diethylsilane, triphenylsilane, trimethylsilane, triethylaluminum and triisobutylaluminum, and a molar ratio of the chain transfer reagent to the iron bipyridine complex is in a range of (1-50):1.

15. The method according to claim 9, wherein a catalytic system comprising the iron bipyridine complex, the cocatalyst and/or the dealkylation reagent is prepared into a premix immediately before use, and the method for preparing the premix is as follows: under an inert gas atmosphere, toluene, the iron bipyridine complex (1 equiv.) and the cocatalyst (10-1000 equiv.) are added sequentially into a 25 mL Schlenk flask and stirred for 1 min; or alternatively toluene, the iron bipyridine complex (1 equiv.), the cocatalyst (5-200 equiv.) and the dealkylation reagent (1-10 equiv.) are added sequentially into a 25 mL Schlenk flask and stirred for 1 min.

* * * * *